US012750788B2

(12) United States Patent
Chen et al.

(10) Patent No.: US 12,750,788 B2
(45) Date of Patent: Sep. 29, 2026

(54) METHOD AND APPARATUS FOR TRANSMITTING UPLINK DATA AND A SYSTEM

(71) Applicant: 1FINITY Inc., Kawasaki (JP)

(72) Inventors: Zhe Chen, Beijing (CN); Xin Wang, Beijing (CN)

(73) Assignee: 1FINITY Inc., Kawasaki (JP)

( * ) Notice: Subject to any disclaimer, the term of this patent is extended or adjusted under 35 U.S.C. 154(b) by 329 days.

(21) Appl. No.: 18/370,984

(22) Filed: Sep. 21, 2023

(65) Prior Publication Data

US 2024/0015665 A1 Jan. 11, 2024

Related U.S. Application Data

(63) Continuation of application No. PCT/CN2021/085221, filed on Apr. 2, 2021.

(51) Int. Cl.
*H04W 52/32* (2009.01)
*H04W 52/08* (2009.01)
*H04W 72/232* (2023.01)

(52) U.S. Cl.
CPC ......... *H04W 52/325* (2013.01); *H04W 52/08* (2013.01); *H04W 72/232* (2023.01)

(58) Field of Classification Search
CPC .. H04W 52/08; H04W 72/232; H04W 52/325
See application file for complete search history.

(56) References Cited

U.S. PATENT DOCUMENTS

2019/0349864 A1* 11/2019 Zhang ................. H04W 52/146
2020/0305168 A1* 9/2020 Liou ..................... H04L 5/0098
(Continued)

FOREIGN PATENT DOCUMENTS

CN 109803362 A 5/2019
EP 4 280 757 A1 11/2023
(Continued)

OTHER PUBLICATIONS

International Search Report and Written Opinion of the International Searching Authority issued by the China National Intellectual Property Administration for corresponding International Patent Application No. PCT/CN2021/085221, mailed on Jan. 6, 2022, with an English translation.
(Continued)

*Primary Examiner* — James P Duffy
(74) *Attorney, Agent, or Firm* — Myers Wolin, LLC

(57) ABSTRACT

An apparatus for transmitting uplink data, configured in a terminal equipment includes a receiver configured to receive a PDCCH transmitted by a network device, the PDCCH indicating the terminal equipment to transmit PUSCH retransmission; wherein CRC to which the PDCCH corresponds is scrambled by a CS-RNTI, and an NDI field of the PDCCH is 1, and a transmitter configured to transmit the PUSCH retransmission according to a first power control parameter in a configured grant (CG) configuration to which the PUSCH retransmission corresponds, the first power control parameter comprising at least one of the following P0, Alpha, a pathloss reference signal (PL-RS), and a closed-loop index, and the first power control parameter being related to at least one of the following factors a power control indication to which the PDCCH corresponds, and an SRS resource indication to which the PDCCH corresponds.

18 Claims, 24 Drawing Sheets

(56) References Cited

U.S. PATENT DOCUMENTS

| | | | |
|---|---|---|---|
| 2020/0322118 | A1 | 10/2020 | Zhang et al. |
| 2020/0404593 | A1 | 12/2020 | Yao et al. |
| 2023/0354325 | A1 | 11/2023 | Sun et al. |

FOREIGN PATENT DOCUMENTS

| | | | |
|---|---|---|---|
| IN | 202017005281 | A | 3/2020 |
| JP | 2024-502148 | A | 1/2024 |
| WO | 2020/063767 | A1 | 4/2020 |
| WO | 2021/043006 | A1 | 3/2021 |
| WO | 2022/152269 | A1 | 7/2022 |

OTHER PUBLICATIONS

Vivo, Enhancements on Multi-TRP for PDCCH, PUCCH and PUSCH, Agenda Item: 8.1.2.1, 3GPP TSG-RAN WG1 Meeting #104-e, R1-2100422, e-Meeting, Jan. 25-Feb. 5, 2021.

Moderator (Nokia et al.), Summary of Multi-TRP for PUCCH and PUSCH, Agenda Item: 8.1.2.1, 3GPP TSG-RAN WG1 Meeting #104-e, R1-210784, e-Meeting, Jan. 25-Feb. 5, 2021.

Notice of Reasons for Refusal issued by the Japan Patent Office for corresponding Japanese Patent Application No. 2023-559861, mailed on Oct. 1, 2024, with an English translation.

The Extended European search report with the Supplementary European search report and the European search opinion, issued by the European Patent Office for corresponding European Patent Application No. 21934065.0, mailed on May 3, 2024.

NTT DOCOMO Inc., "Offline discussions on URLLC enhanced configured grant transmission", Agenda Item: 7.2.6.6, 3GPP TSG RAN WG1 Meeting #99, R1-1913360, Reno, US, Nov. 18-22, 2019.

3GPP TS 38.212 V16.5.0, "3rd Generation Partnership Project; Technical Specification Group Radio Access Network; NR; Multiplexing and channel coding (Release 16)", Mar. 2021.

3GPP TS 38.213 V16.5.0, "3rd Generation Partnership Project; Technical Specification Group Radio Access Network; NR; Physical layer procedures for control (Release 16)", Mar. 2021.

3GPP TS 38.214 V16.5.0, "3rd Generation Partnership Project; Technical Specification Group Radio Access Network; NR; Physical layer procedures for data (Release 16)", Mar. 2021.

3GPP TS 38.321 V16.4.0, "3rd Generation Partnership Project; Technical Specification Group Radio Access Network; NR; Medium Access Control (MAC) protocol specification (Release 16)", Mar. 2021.

3GPP TS 38.331 V16.4.1, "3rd Generation Partnership Project; Technical Specification Group Radio Access Network; NR; Radio Resource Control (RRC) protocol specification (Release 16)", Mar. 2021.

First Notification of Office Action and Search Report issued by the China National Intellectual Property Administration for corresponding Chinese Patent Application No. 202180095146.7, mailed on Mar. 11, 2026, with an English translation.

Communication pursuant to Article 94(3) EPC issued by the European Patent Office for corresponding European Patent Application No. 21934065.0, mailed on Dec. 18, 2025.

3GPP TS 38.213 V15.12.0 "3rd Generation Partnership Project; Technical Specification Group Radio Access Network; Physical layer procedures for control (Release 15)," 3GPP Server , Dec. 2020, cited in KROA.

Notice of Preliminary Rejection issued by the Korean Intellectual Property Office for corresponding Korean Patent Application No. 10-2023-7033537, mailed on Oct. 24, 2025, with an English translation.

* cited by examiner

FIG. 15

CRC scrambled
with CS-RNTI
with NDI=1

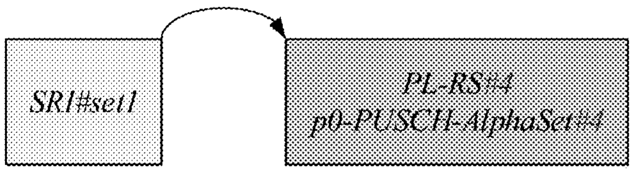

sTRP retransmision:
*SRI#set1* → *PL-RS#1* → *P0-PUSCH-AlphaSet#1* → ***PUSCH-ClosedLoopIndex* = *1***
*SRI#set2* → *Null*

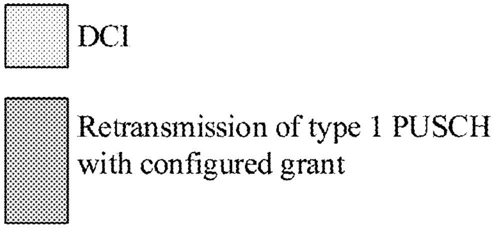

Type 1 CG

*ConfiguredGrantConfig*
- ***powerControlLoopToUse* = *0***
  - *p0-PUSCH-Alpha* = *p0-PUSCH-AlphaSet#3*
- ***powerControlLoopToUse* = *1***
  - *p0-PUSCH-Alpha* = *p0-PUSCH-AlphaSet#4*

*rrc-ConfiguredUplinkGrant*
- ***powerControlLoopToUse* = *0***
  - *pathlossReferenceIndex1* = *PL-RS#3*
- ***powerControlLoopToUse* = *1***
  - *pathlossReferenceIndex2* = *PL-RS#4*

FIG. 16

CRC scrambled with CS-RNTI with NDI=1

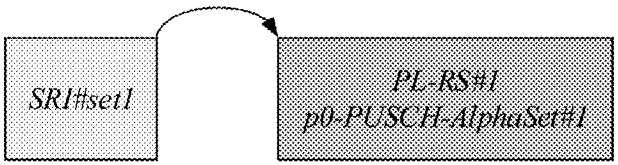

mTRP retransmission:
*SRI#set1* → *PL-RS#1* → *P0-PUSCH-AlphaSet#1* → ***PUSCH-ClosedLoopIndex* = 1**
*SRI#set2* → *Null*

DCI

Retransmission of type 1 PUSCH with configured grant

Type 1 CG

*ConfiguredGrantConfig*
- ***powerControlLoopToUse* = 0**
  - *p0-PUSCH-Alpha* = *p0-PUSCH-AlphaSet#3*
- ***powerControlLoopToUse* = 1**
  - *p0-PUSCH-Alpha* = *p0-PUSCH-AlphaSet#4*

*rrc-ConfiguredUplinkGrant*
- ***powerControlLoopToUse* = 0**
  - *pathlossReferenceIndex1* = *PL-RS#3*
- ***powerControlLoopToUse* = 1**
  - *pathlossReferenceIndex2* = *PL-RS#4*

CRC scrambled
with CS-RNTI
with NDI=1 mTRP retransmission:
*SRI#set1* → *PL-RS#1* → *P0-PUSCH-AlphaSet#1* →*PUSCH-ClosedLoopIndex = 1*
*SRI#set2* → *Null*

DCI

Retransmission of type 2 PUSCH
with configured grant

Type 2 CG

*ConfiguredGrantConfig*
- *powerControlLoopToUse = 0*
  - *p0-PUSCH-Alpha = p0-PUSCH-AlphaSet#3*
- *powerControlLoopToUse = 1*
  - *p0-PUSCH-Alpha = p0-PUSCH-AlphaSet#4*

METHOD AND APPARATUS FOR TRANSMITTING UPLINK DATA AND A SYSTEM

CROSS-REFERENCE TO RELATED APPLICATION

This application is a continuation application of International Application PCT/CN2021/085221 filed on Apr. 2, 2021, and designated the U.S., the entire contents of which are incorporated herein by reference.

FIELD

This disclosure relates to the field of communication technologies.

BACKGROUND

In order to meet requirements of URLLC (Ultra-Relaible and Low Latency Communication) services for high reliability and low latency, NR Rel-16 (New Radio Release 16) has introduced a corresponding uplink data transmission mechanism. This mechanism supports more flexible uplink data transmission, thereby reducing latency of uplink data transmission.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY OF THE DISCLOSURE

It was found by the inventors that as NR (New radio) supports a central transmission frequency of up to 52.6 GHz, in high-frequency scenarios, due to that a diffraction ability of a high-frequency radio signal is relatively poor, it is prone to be affected by blockages. Degradation of channel quality caused by the blockages is very detrimental to uplink transmission. This is because that according to an existing beam failure recovery mechanism, it costs tens of milliseconds at most to recover a communication link, while a requirement of URLLC for communication delay is generally much less than tens of milliseconds.

Therefore, a high-frequency uplink is prone to be affected by blockages, and channels may possibly instantly deteriorate. The existing recovery mechanism takes too long to meet the requirements of URLLC services for latency. In order to reduce impacts of blockages on uplink data transmission, a feasible approach is to transmit uplink data in a spatial diversity manner. That is, at a terminal equipment side, the same data may reach a network device via different spatial domain paths or via different TRPs (transmission and reception points) at different times. Hence, in a case where blockage occurs in a path, other paths may still continue to operate, thereby ensuring low latency and high reliability of uplink data.

However, for initial transmission and retransmission of uplink transmission with configured grant, an NR system is unable to support the above method. This will lead to lack of reliability in the NR system, and especially when the NR system uses the uplink transmission with configured grant to transmit URLLC services, due to that spatial diversity is unable to be used for transmission, reliability of uplink transmission is insufficient to meet the requirements of URLLC services.

In order to solve the above problems or other similar problems, embodiments of this disclosure provide a method and apparatus for transmitting uplink data and a system, so as to solve transmission problems of retransmission of uplink transmission with configured grant.

According to an aspect of the embodiments of this disclosure, there is provided an apparatus for transmitting uplink data, wherein the apparatus includes:

a receiving unit configured to receive a PDCCH transmitted by a network device, the PDCCH indicating the terminal equipment to transmit PUSCH retransmission; wherein CRC to which the PDCCH corresponds is scrambled by a CS-RNTI, and an NDI field of the PDCCH is 1; and a transmitting unit configured to transmit the PUSCH retransmission according to a first power control parameter in a configured grant (CG) configuration to which the PUSCH retransmission corresponds, the first power control parameter including at least one of the following:

P0,

Alpha, a pathloss reference signal (PL-RS), and a closed-loop index;

and the first power control parameter being related to at least one of the following factors:

a power control indication to which the PDCCH corresponds;

an SRS resource indication to which the PDCCH corresponds; and an SRS resource set used for PUSCH transmission and configured for the terminal equipment.

According to another aspect of the embodiments of this disclosure, there is provided an apparatus for transmitting uplink data, wherein the apparatus includes:

a receiving unit configured to receive a PDCCH transmitted by a network device, the PDCCH indicating the terminal equipment to transmit PUSCH retransmission; wherein CRC to which the PDCCH corresponds is scrambled by a CS-RNTI, and an NDI field of the PDCCH is 1; and a transmitting unit configured to transmit the PUSCH retransmission according to a third power control parameter, the third power control parameter referring to a parameter in UE-specific PUSCH configuration information and including at least one of the following:

P0,

Alpha, a pathloss reference signal (PL-RS), and a closed-loop index;

and the third power control parameter being related to at least one of the following factors:

a power control indication to which the PDCCH corresponds;

an SRS resource indication to which the PDCCH corresponds; and an SRS resource set used for PUSCH transmission and configured for the terminal equipment.

An advantage of the embodiments of this disclosure exists in that according to the embodiments of this disclosure, transmission problems of retransmission of uplink transmission with configured grant are solved, and when an uplink transmission with configured grant fails, the network device may indicate the terminal equipment to perform retransmission of uplink transmission with configured grant in a more reliable uplink transmission mode (or, a more reliable uplink power control parameter), thereby enhancing robustness.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiments.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings:

FIGS. 15 and 16 are schematic diagrams of uplink data transmission under type 1 CG configuration corresponding to the scenario in FIG. 4;

DETAILED DESCRIPTION OF THE DISCLOSURE

Figure 1:
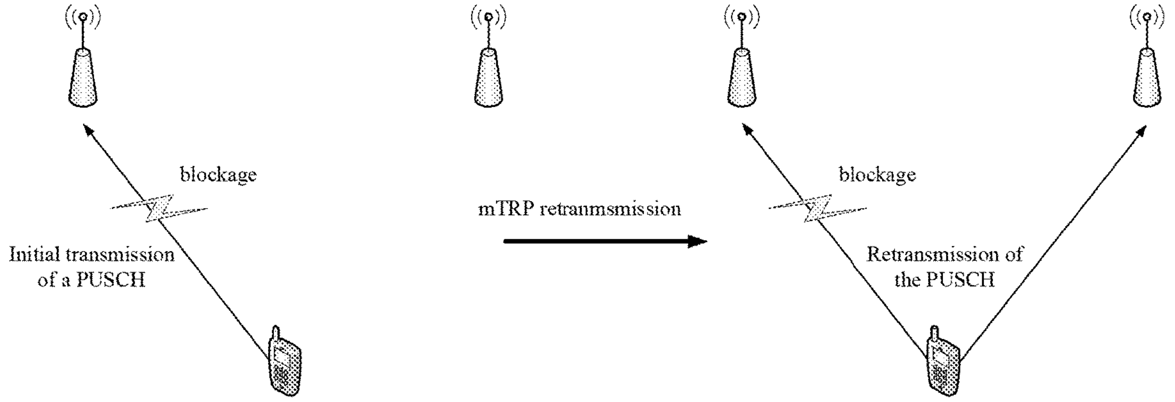
FIG. 1 is a schematic diagram of an application scenario where a single TRP (one group of power control parameters) is used for initial transmission and multiple TRPs (multiple groups of power control parameters) are used for retransmission.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to a device in a communication system that accesses a user equipment to the communication network and provides services for the user equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

In the embodiments, the base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, depending on a context of the term.

In the embodiments of this disclosure, the term "user equipment (UE)" refers to, for example, an equipment accessing to a communication network and receiving network services via a network device, and may also be referred to as "a terminal equipment (TE)". The terminal equipment may be fixed or mobile, and may also be referred to as a mobile station (MS), a terminal, a subscriber station (SS), an access terminal (AT), or a station, etc.

In the embodiments, the terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

In current standards, in order to reduce transmission latency of uplink data and improve transmission reliability, NR has introduced uplink transmission with configured grant. The uplink transmission with configured grant is generally used to transmit PUSCHs (physical uplink shared channels), and includes mainly two types, i.e. type 1 PUSCH transmissions with a configured grant (referred to as type 1 PUSCH) and type 2 PUSCH transmissions with a configured grant (referred to as type 2 PUSCH).

For the type 1 PUSCH transmissions with a configured grant.

Resources used by initial transmission of type 1 PUSCH are configured by RRC (radio resource control) signaling, such as configuredGrantConfig. After the configuration information takes effect, a terminal equipment may transmit a PUSCH on its configured resources, and the PUSCH does not need to be scheduled by a PDCCH (physical downlink control channel).

Retransmission of type 1 PUSCH is scheduled by a PDCCH. CRC (cyclic redundancy check) of the PDCCH is scrambled by a CS-RNTI (configured scheduling radio network temporary identifier), and an NDI (new data indicator) field to which it correspond is 1 (PDCCH with CRC scrambled by CS-RNTI with NDI=1); in addition, some parameters required for the retransmission of the PUSCH are provided by RRC signaling (such as configuredGrantConfig) to which type 1 configured grant corresponds, and reference may be made to existing standards for specific implementations.

For type 2 PUSCH transmissions with a configured grant.

Initial transmission of Type 2 PUSCH is triggered/activated by a PDCCH/DCI (downlink control information), and a part of parameters used for corresponding PUSCH transmission are configured by higher-layer configuration information, and another part thereof are indicated by the PDCCH/DCI.

Retransmission of type 2 PUSCH is scheduled by a PDCCH. CRC of the PDCCH is scrambled by a CS-RNTI, and its corresponding NDI field is 1 (PDCCH with CRC scrambled by CS-RNTI with NDI=1); in addition, a part of parameters required for the PUSCH retransmission are provided by its corresponding type 2 configured grant configuration (such as configuredGrantConfig), and the other part thereof are indicated by the PDCCH/DCI, and reference may be made to existing standards for specific implementations.

The embodiments of this disclosure are applicable to the following four scenarios.

Scenario 1

The uplink transmission with configured grant is configured as single TRP (sTRP) transmission; and when it is found that corresponding uplink transmission is unable to be successfully received, the network device (gNB) may initiate retransmission of the uplink transmission, and the retransmission is multiple TRP (mTRP) transmission, as shown in FIG. 1.

With the above method, when a (sTRP) uplink transmission fails, the gNB may indicate the terminal equipment (UE) to perform retransmission of uplink transmission by using a more reliable uplink transmission method (mTRP), so as to enhance robustness.

Scenario 2

Figure 2:
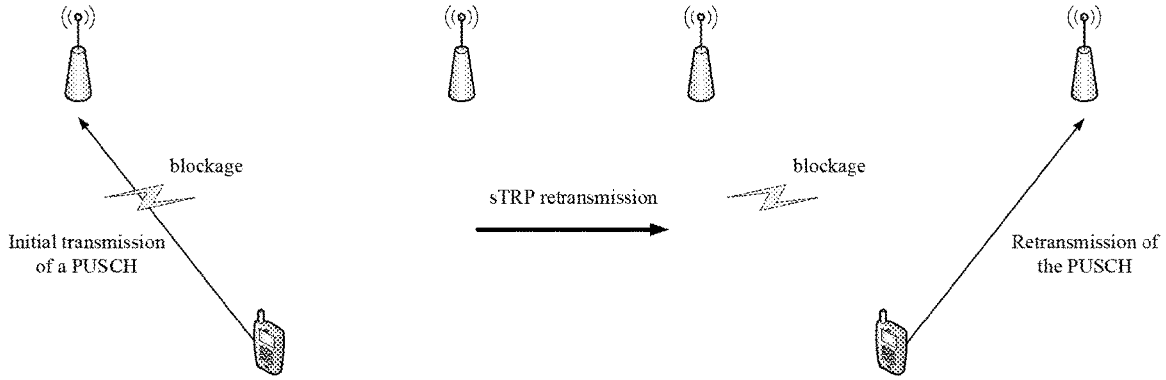
FIG. 2 is a schematic diagram of an application scenario where a single TRP (one group of power control parameters) is used for both initial transmission and retransmission.

The uplink transmission with configured grant is configured as single TRP transmission; and when it is found that corresponding uplink transmission is unable to be successfully received, the gNB may initiate retransmission of the uplink transmission, and the retransmission is transmitted by using a TRP identical to or different from that used in the initial transmission, as shown in FIG. 2.

with the above method, when a (sTRP) uplink transmission fails, the gNB may flexibly indicate the UE to perform retransmission of uplink transmission by using a more reliable TRP, so as to enhance robustness.

Scenario 3

Figure 3:
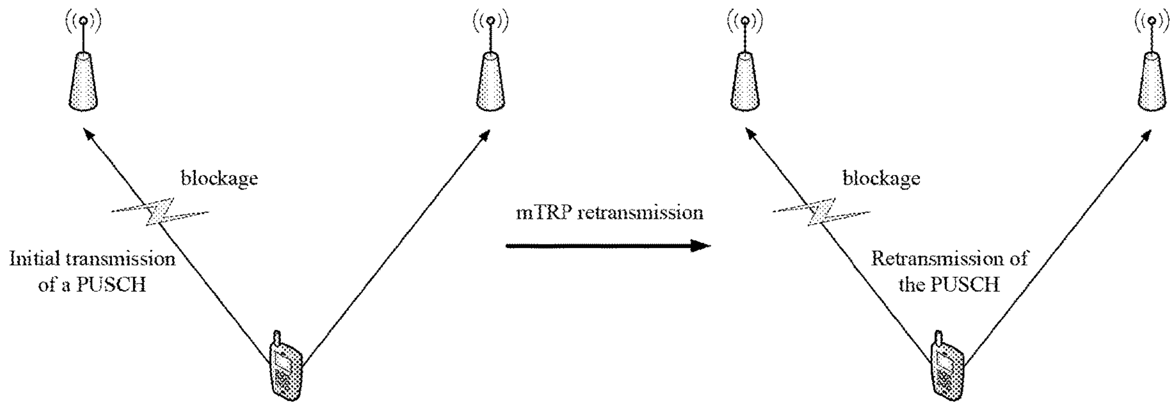
FIG. 3 is a schematic diagram of an application scenario where multiple TRPs (multiple groups of power control parameters) are used for both initial transmission and retransmission.

The uplink transmission with configured grant is configured as multiple TRP transmission; and when it is found that corresponding uplink transmission is unable to be successfully received, the gNB may initiate retransmission of the uplink transmission, and as the gNB possibly does not learn which TRP corresponds to a link where a problem occurs, the retransmission is transmitted by using a TRP identical to that used in the initial transmission, as shown in FIG. 3.

with the above method, when a (mTRP) uplink transmission fails, the gNB may flexibly indicate the UE to perform retransmission of uplink transmission by using the mTRP, so as to enhance robustness.

Scenario 4

Figure 4:
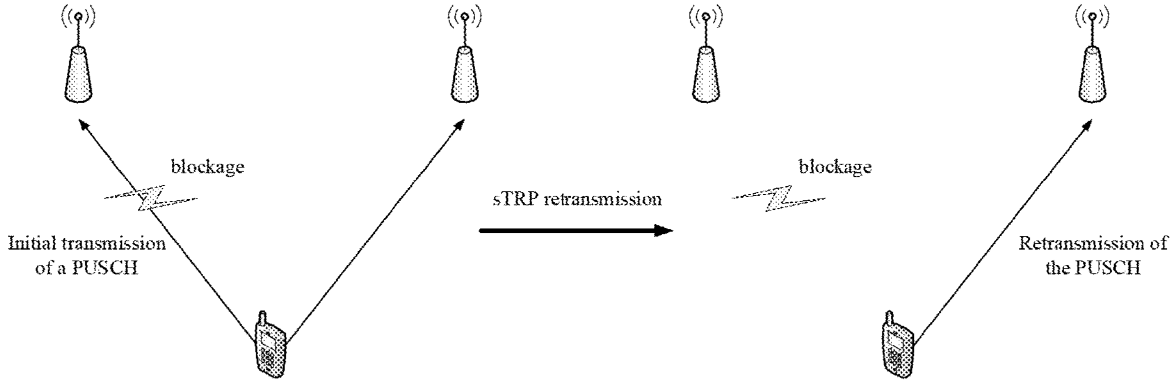
FIG. 4 is a schematic diagram of an application scenario where multiple TRPs (multiple groups of power control parameters) are used for initial transmission and a single TRP (one group of power control parameters) is used for retransmission.

The uplink transmission with configured grant is configured as multiple TRP transmission; and when it is found that corresponding uplink transmission is unable to be successfully received, the gNB may initiate retransmission of the uplink transmission, and the retransmission is transmitted by using a TRP identical to or different from that used in the initial transmission, as shown in FIG. 4.

with the above method, when a (mTRP) uplink transmission fails, the gNB may flexibly indicate the UE to perform retransmission of uplink transmission by using the sTRP. As the sTRP uplink transmission (one time-domain resource) takes a time shorter than that used by the mTRP uplink transmission (two time-domain resources), this method may reduce occurred latency; and furthermore, this method may prevent the UE from transmitting via a TRP with a poor channel condition, thereby enhancing robustness.

Various embodiments of this disclosure shall be described below with reference to the accompanying drawings. These embodiments are illustrative only and are not intended to limit this disclosure.

Embodiment of a First Aspect

The embodiment of this disclosure provides a method for transmitting uplink data, which shall be described from a side of a terminal equipment.

Figure 5:
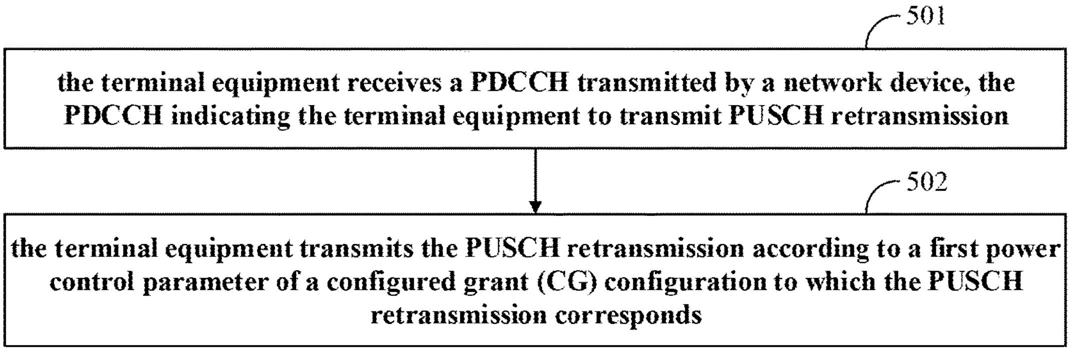
FIG. 5 is a schematic diagram of the method for transmitting uplink data of an embodiment of this disclosure.

FIG. 5 is a schematic diagram of the method for transmitting uplink data of the embodiment of this disclosure. Referring to FIG. 5, the method includes:

501: the terminal equipment receives a PDCCH transmitted by a network device, the PDCCH indicating the terminal equipment to transmit PUSCH retransmission; wherein CRC to which the PDCCH corresponds is scrambled by a CS-RNTI, and an NDI field of the PDCCH is 1; and

502: the terminal equipment transmits the PUSCH retransmission according to a first power control parameter in a configured grant (CG) configuration to which the PUSCH retransmission corresponds, In the embodiment of this disclosure, the first power control parameter includes at least one of the following:

P0,

Alpha, a pathloss reference signal (PL-RS), and a closed-loop index;

In the embodiment of this disclosure, the first power control parameter is related to at least one of the following factors:

a power control indication to which the PDCCH corresponds;

an SRS resource indication to which the PDCCH corresponds; and an SRS resource set used for PUSCH transmission and configured for the terminal equipment.

According to the method of the embodiment of this disclosure, the terminal equipment transmits the PUSCH retransmission according to a power control parameter related to at least one of the above factors (the first power control parameter), so as to solve transmission problems of retransmission of uplink transmission with configured grant. After a uplink transmission with configured grant fails, the network device may indicate the terminal equipment to perform retransmission of uplink transmission with configured grant by using a more reliable uplink transmission method, so as to enhance robustness.

In the embodiment of this disclosure, reference may be made to related techniques for meanings of P0, Alpha, PL-RS and close loop index, which shall not be described herein any further.

In some embodiments, the first power control parameter being related to a power control indication to which the PDCCH corresponds refers to that a closed-loop index to which the first power control parameter corresponds is identical to a closed-loop index indicated by the PDCCH, that is, the PDCCH indicates a closed-loop index related to uplink power control. When the closed-loop index indicated by the PDCCH is identical to the closed-loop index related to uplink power control and corresponding to the first power control parameter, the terminal equipment transmits retransmission of the PUSCH according to the first power control parameter. An advantage of this method is that the uplink power control parameter in the corresponding configured grant configuration used for corresponding PUSCH retransmission is determined by using the uplink closed-loop power control index of the PDCCH, thereby avoiding a situation where the power control parameter indications are unclear. In addition, as the PDCCH is able to provide dynamic indications, which power control parameters in the configured grant configuration may be used for PUSCH retransmission may be more flexibly indicated, thereby the PUSCH may use more suitable uplink transmission power in a scenario where a channel environment changes rapidly, and improving system performances.

In some embodiments, the power control indication to which the PDCCH corresponds refers to an indication of at least one of the following power control parameters by the PDCCH:

P0,

Alpha, a pathloss reference signal (PL-RS), and a closed-loop index.

In the above embodiment, the power control indication to which the PDCCH corresponds includes an indication of at least one of P0, Alpha, pathloss reference signal and closed-loop index, and the terminal equipment transmits retransmission of the PUSCH by using the first power control parameter in the CG configuration corresponding to the parameter indicated by the power control indication to which the PDCCH corresponds. For example, the PDCCH indicates P0, and if the first power control parameter in the CG configuration correspondingly includes P0, the PUSCH retransmission is transmitted according to P0 indicated by the first power control parameter in the CG configuration, and behaviors of other parameters are similar thereto.

In some embodiments, the power control indication to which the PDCCH corresponds refers to that one or two groups of power control parameters are indicated by the PDCCH, wherein each group of power control parameters includes at least one of the following:

P0,

Alpha, a pathloss reference signal (PL-RS), and a closed-loop index.

In the above embodiment, the power control indication to which the PDCCH corresponds includes indications for one or two groups of power control parameters, and two groups of power control parameters are configured in the CG configuration (both two groups of power control parameters are referred to as "first power control parameters"). Here, the power control indication to which the PDCCH corresponds is used to indicate a power control parameter in the CG configuration used for PUSCH transmission. For example, if the power control indication to which the PDCCH corresponds indicates a group of power control parameters, the terminal equipment transmits the PUSCH according to one of the two groups of power control parameters in the CG configuration; and if the power control indication to which the PDCCH corresponds indicates two groups of power control parameters, the terminal equipment transmits the PUSCH according to the two groups of power control parameters in the CG configuration. An advantage of this indication method is that with an implicit indication mode, the PDCCH is used to indicate the number of groups of power control parameters, and the number of groups of power control parameters in the CG configuration used for the PUSCH retransmission is determined, without needing to introduce additional indication signaling, thereby saving resources.

In the above embodiment, that the power control indication to which the PDCCH corresponds includes indications for one or two groups of power control parameters may also refer to that each group of power control parameters contains or corresponds to a closed-loop index, and in a case where the closed-loop index/indices of one or two groups of power control parameters is/are identical to the closed-loop index to which the first power control parameter in the CG configuration corresponds, the terminal equipment transmits retransmission of the PUSCH by using the first power control parameter in the CG configuration.

In some embodiments, that the first power control parameter is related to the SRS resource indication to which the PDCCH corresponds refers to that the first power control parameter is determined by the SRS resource indication, and the SRS resource indication includes a first SRS resource indication and/or a second SRS resource indication. That is, the PDCCH includes a first SRS resource indication and/or a second SRS resource indication, the first SRS resource indication and/or the second SRS resource indication corresponding to the first power control parameter in the CG configuration, and according to the first SRS resource indication and/or the second SRS resource indication, the terminal equipment determines its corresponding first power control parameter, and transmits retransmission of the PUSCH by using the determined first power control parameter. An advantage of this indication method is that with an implicit indication mode, the PDCCH is used to indicate the SRS resources, and the power control parameters in the CG configuration used for the PUSCH retransmission are determined, without needing to introduce additional indication signaling, thereby saving resources.

In some embodiments, the SRS resource indication to which the PDCCH corresponds refers to indication(s) for the first SRS resource set and/or the second SRS resource set by the PDCCH; wherein, the first SRS resource set is used for PUSCH transmission, and the second SRS resource set is used for PUSCH transmission.

In the above embodiment, the SRS resource indication to which the PDCCH corresponds contains indication(s) for the first SRS resource set and/or the second SRS resource set, and both of the SRS resource sets are used to transmit the PUSCH. The terminal equipment determines the first power control parameter in the CG configuration according to the indication(s) for the first SRS resource set and/or the second SRS resource set, and transmits retransmission of the PUSCH by using the first power control parameter in the CG configuration. An advantage of this indication method is that with an implicit indication mode, the PDCCH is used to indicate the SRS resource sets, and the power control parameters in the CG configuration used for the PUSCH retransmission are determined, without needing to introduce additional indication signaling, thereby saving resources.

In some embodiments, the SRS resource indication to which the PDCCH corresponds refers to the first SRS resource indication and/or the second SRS resource indication.

In the above embodiment, the SRS resource indication to which the PDCCH corresponds includes an indication for the first SRS resource and/or an indication for the second SRS resource, and the terminal equipment determines the first power control parameter in the CG configuration according to the indication for the first SRS resource and/or the indication for the second SRS resource, and transmits retransmission of the PUSCH by using the first power control parameter in the CG configuration.

In some embodiments, the first power control parameter being related to an SRS resource set used for PUSCH transmission and configured for the terminal equipment refers to that the first power control parameter is determined according to the number of SRS resource sets used for PUSCH transmission and configured on an active BWP (bandwidth part) to which the PUSCH retransmission transmitted by the terminal equipment corresponds. That is, the first power control parameter in the CG configuration is determined according to the number of SRS resource sets used for PUSCH transmission and configured on the active BWP. For example, if two SRS resource sets used for PUSCH transmission are configured on the active BWP, the terminal equipment transmits retransmission of the PUSCH according to the first power control parameter in the CG configuration. Hence, in the case where two SRS resource sets are configured, the terminal equipment is able to transmit the PUSCH according to the first power control parameter in the CG configuration, thereby avoiding ambiguity of indications of the power control parameters.

In some embodiments, the SRS resource set used for PUSCH transmission and configured for the terminal equipment refers to one or two SRS resource sets configured by the terminal equipment on the active BWP to which the PUSCH retransmission corresponds, wherein the one or two SRS resource sets are used for PUSCH transmission.

In the above embodiment, according to the number of the SRS resource sets configured on the active BWP, the terminal equipment may determine whether to transmit retransmission of the PUSCH by using the first power control parameter in the CG configuration, thereby avoiding a problem of ambiguity of indications of the power control parameters. An advantage of this indication method is that with an implicit indication mode, the power control parameter in the CG configuration used for PUSCH retransmission are determined according to the number of SRS resource sets used for PUSCH transmission on the active BWP configured by RRC signaling, without needing to introduce additional indication signaling, thereby saving resources.

In the embodiment of this disclosure, in some embodiments, the terminal equipment may further transmit the PUSCH retransmission according to a second power control parameter, the second power control parameter referring to a parameter in UE-specific PUSCH configuration information. That is, the terminal equipment may transmit the PUSCH retransmission according to the first power control parameter in the CG configuration and the second power control parameter.

In this embodiment, the second power control parameter includes at least one of the following:

P0,

Alpha, a pathloss reference signal (PL-RS), and a closed-loop index.

Reference may be made to related techniques for meanings of the above parameters, which shall not be repeated herein any further.

In the embodiment of this disclosure, the second power control parameter is related to at least one of the following factors:

a power control indication to which the PDCCH corresponds;

an SRS resource indication to which the PDCCH corresponds;

an SRS resource set used for PUSCH transmission and configured for the terminal equipment.

Related meanings and meanings of the above parameters have been described above, which shall not be repeated herein any further.

It should be noted that FIG. 5 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 5.

Figure 6:
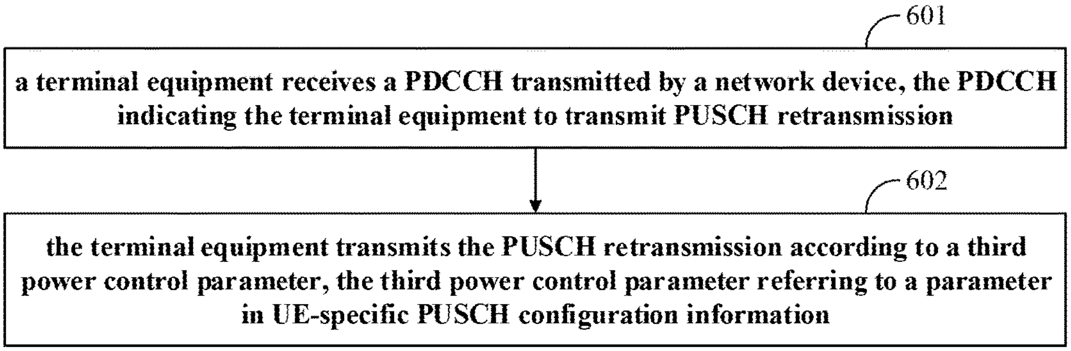
FIG. 6 is another schematic diagram of the method for transmitting uplink data of the embodiment of this disclosure.

FIG. 6 is another schematic diagram of the method for transmitting uplink data of the embodiment of this disclosure. Referring to FIG. 6, the method includes:

601: a terminal equipment receives a PDCCH transmitted by a network device, the PDCCH indicating the terminal equipment to transmit PUSCH retransmission; wherein CRC to which the PDCCH corresponds is scrambled by a CS-RNTI, and an NDI field of the PDCCH is 1; and

602: the terminal equipment transmits the PUSCH retransmission according to a third power control parameter, the third power control parameter referring to a parameter in UE-specific PUSCH configuration information.

In the embodiment of this disclosure, the third power control parameter includes at least one of the following:

P0,

Alpha, a pathloss reference signal (PL-RS), and a closed-loop index.

Reference may be made to related techniques for meanings of the above parameters, which shall not be repeated herein any further.

In the embodiment of this disclosure, the third power control parameter is related to at least one of the following factors:

a power control indication to which the PDCCH corresponds;

SRS resource indication to which the PDCCH corresponds; and an SRS resource set used for PUSCH transmission and configured for the terminal equipment.

According to the method of the embodiment of this disclosure, the terminal equipment transmits retransmission of the PUSCH only according to the power control parameter (the third power control parameter) related to at least one of the above factors in the UE-specific PUSCH configuration information, thereby solving the transmission problem of retransmission of the uplink transmission with configured grant. When an uplink transmission with configured grant fails, the network device may indicate the terminal equipment to perform retransmission of the uplink transmission with configured grant by using a more reliable uplink transmission method, thereby enhancing robustness.

In some embodiments, the third power control parameter being related to a power control indication to which the PDCCH corresponds refers to that a closed-loop index to which the third power control parameter corresponds is identical to a closed-loop index indicated by the PDCCH, and a power control parameter corresponding to the closed-loop index is not configured in configured grant (CG) configuration corresponding to the PUSCH retransmission. That is, in the case where the CG configuration corresponding to PUSCH retransmission is not configured with the power control parameter corresponding to the closed-loop index, the power control parameter corresponding to the UE-specific PUSCH configuration information indicated by the PDCCH is used to transmit PUSCH retransmission.

In the above embodiment, the power control indication to which the PDCCH corresponds has been described above, which shall not be repeated herein any further.

In some embodiments, the third power control parameter being related to an SRS resource indication to which the PDCCH corresponds refers to that the third power control parameter is determined according to the SRS resource indication, the SRS resource indication including a first SRS resource indication and/or a second SRS resource indication. That is, the third power control parameter is determined according to the first SRS resource indication and/or the second SRS resource indication to which the PDCCH corresponds, and PUSCH retransmission is transmitted by using the third power control parameter.

In the above embodiment, the SRS resource indication to which the PDCCH corresponds has been described above, which shall not be repeated herein any further.

In some embodiments, the third power control parameter being related to an SRS resource set configured for the terminal equipment refers to that the third power control parameter is determined according to the number of SRS resource sets configured on an active BWP to which the PUSCH retransmission transmitted by the terminal equipment corresponds. That is, the third power control parameter is determined according to the number of SRS resource sets configured on the active BWP, and PUSCH retransmission is transmitted by using the third power control parameter. For example, when the number of SRS resource sets used for PUSCH retransmission and configured on the active BWP corresponding to the above PUSCH retransmission is 2, the terminal equipment transmits the PUSCH retransmission according to the third power control parameter. An advantage of this indication method is that with an implicit indication mode, according to the number of SRS resource sets used for PUSCH transmission on the active BWP configured by RRC signaling, the UE-specific PUSCH power control parameter used for PUSCH retransmission is determined, without needing to introduce additional indication signaling, thereby saving resources.

In the above embodiment, the SRS resource sets configured for the terminal equipment has been described above, which shall not be repeated herein any further.

In order to make the method of the embodiment of this disclosure more clear and understandable, applications of the method of the embodiment of this disclosure shall be described below with reference to the above four scenarios.

Figure 7:
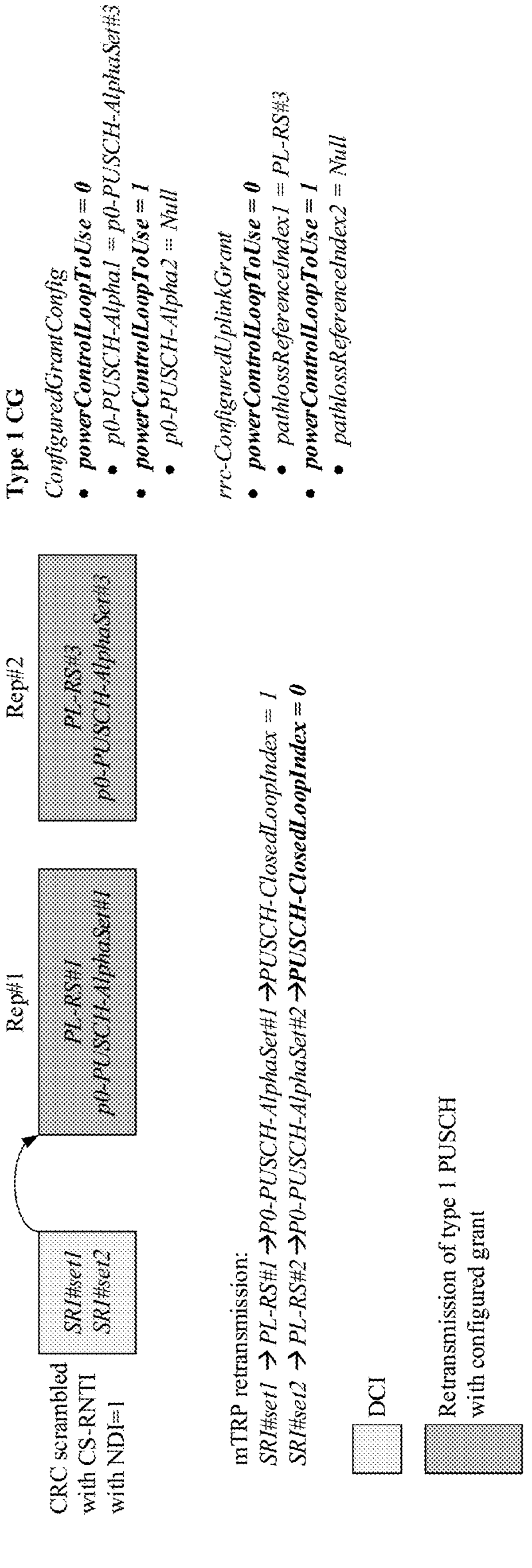
FIGS. 7-9 are schematic diagrams of uplink data transmission under type 1 CG configuration corresponding to the scenario in FIG. 1.
Figure 8:
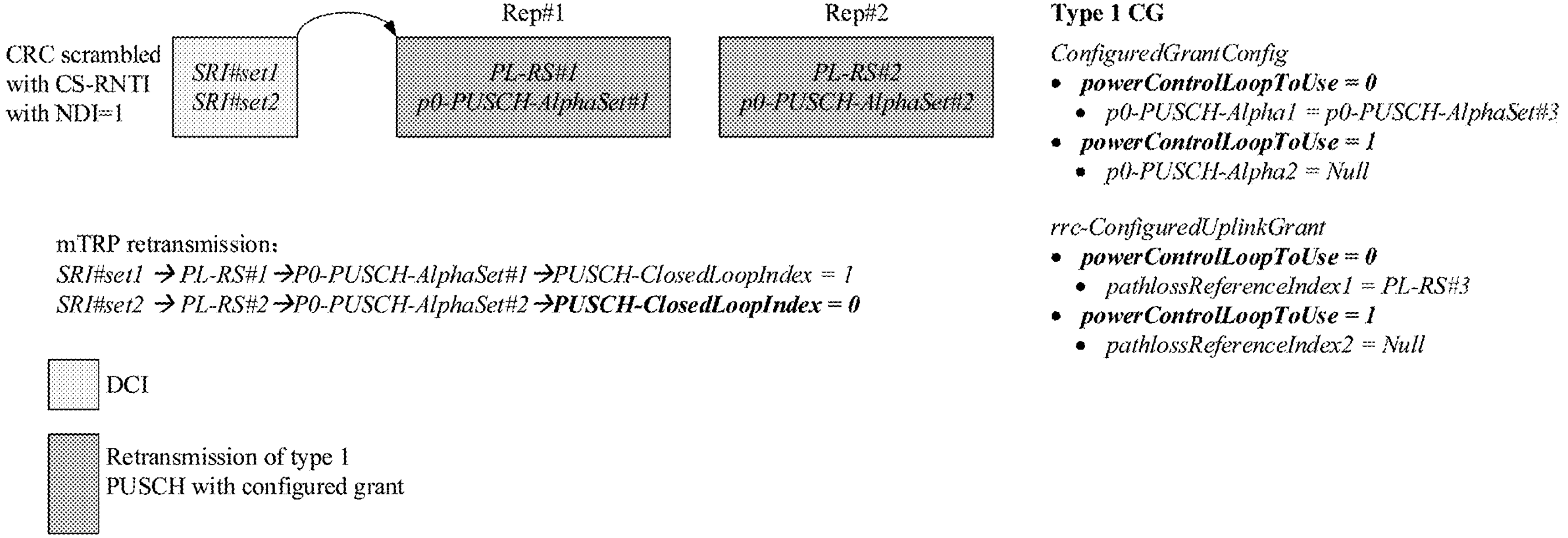
Figure 9:
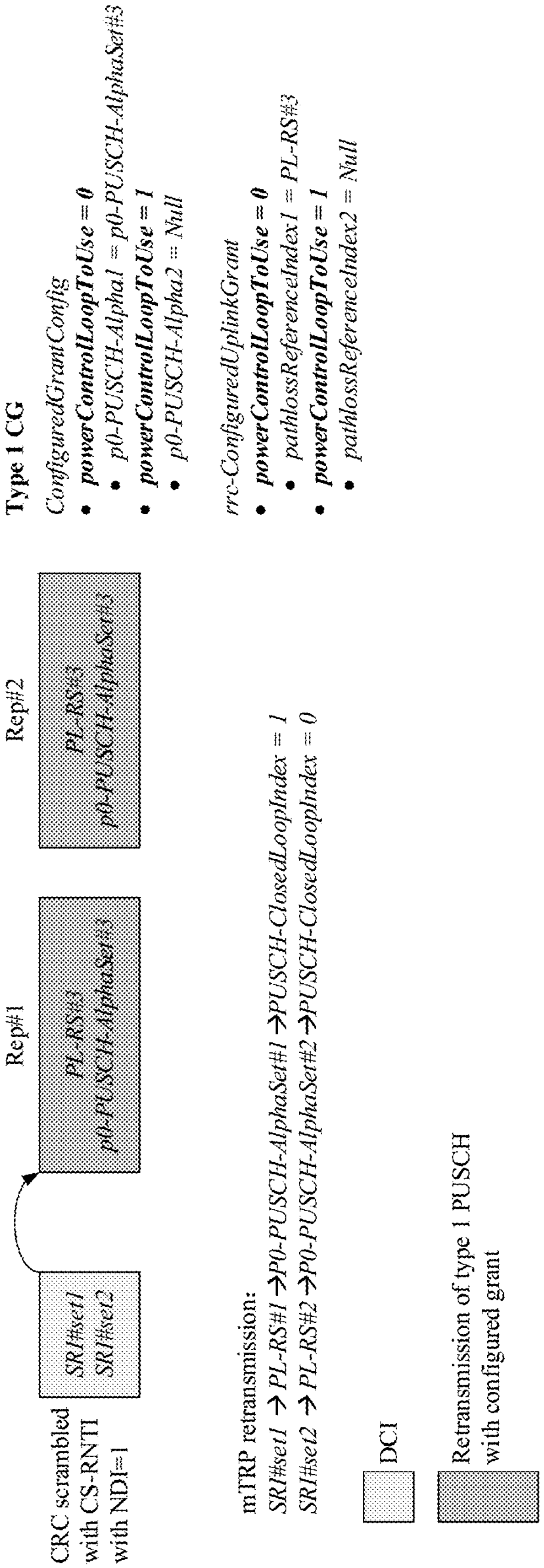
Figure 10:
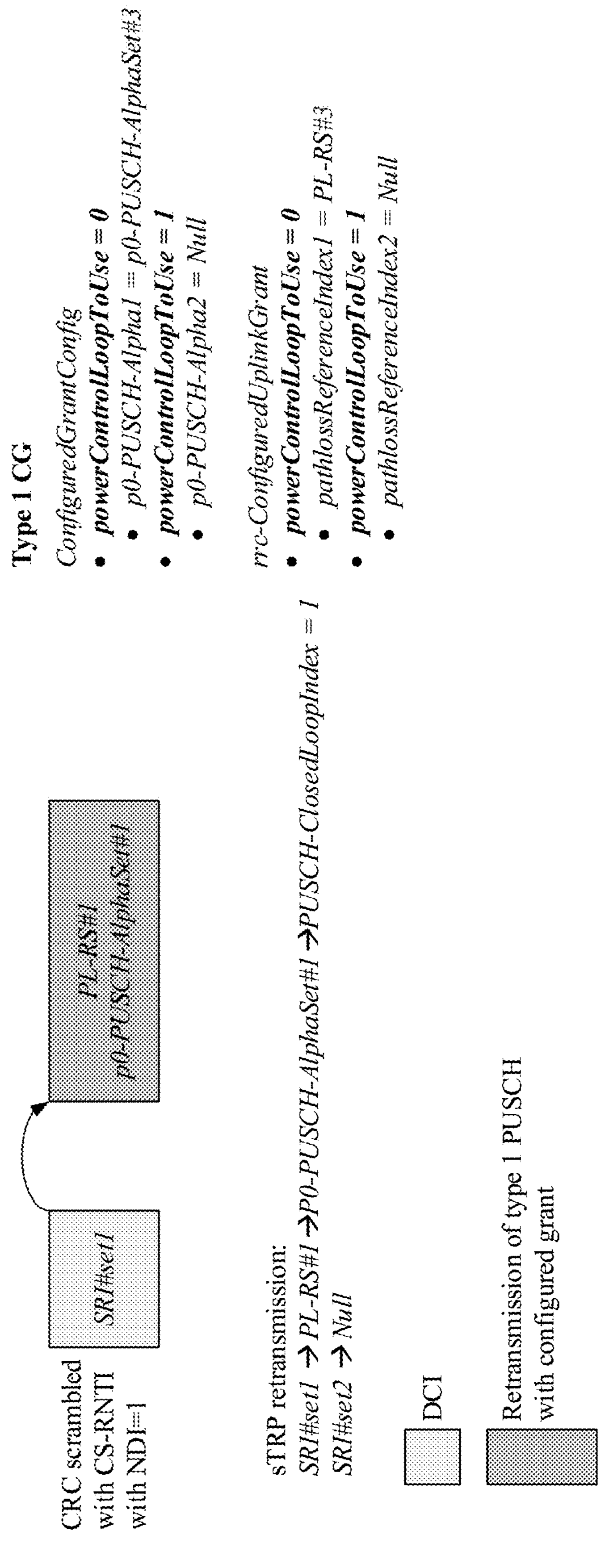
FIGS. 10-12 are schematic diagrams of uplink data transmission under type 1 CG configuration corresponding to the scenario in FIG. 2.
Figure 11:
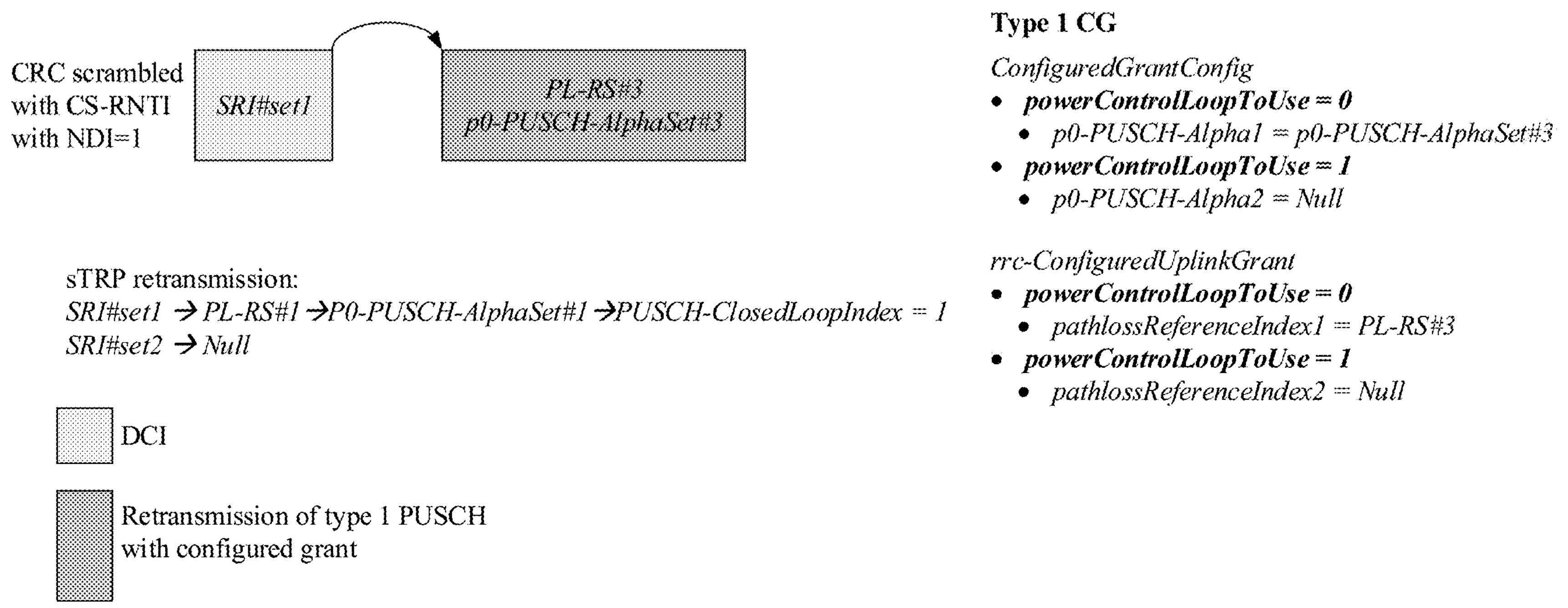
Figure 12:
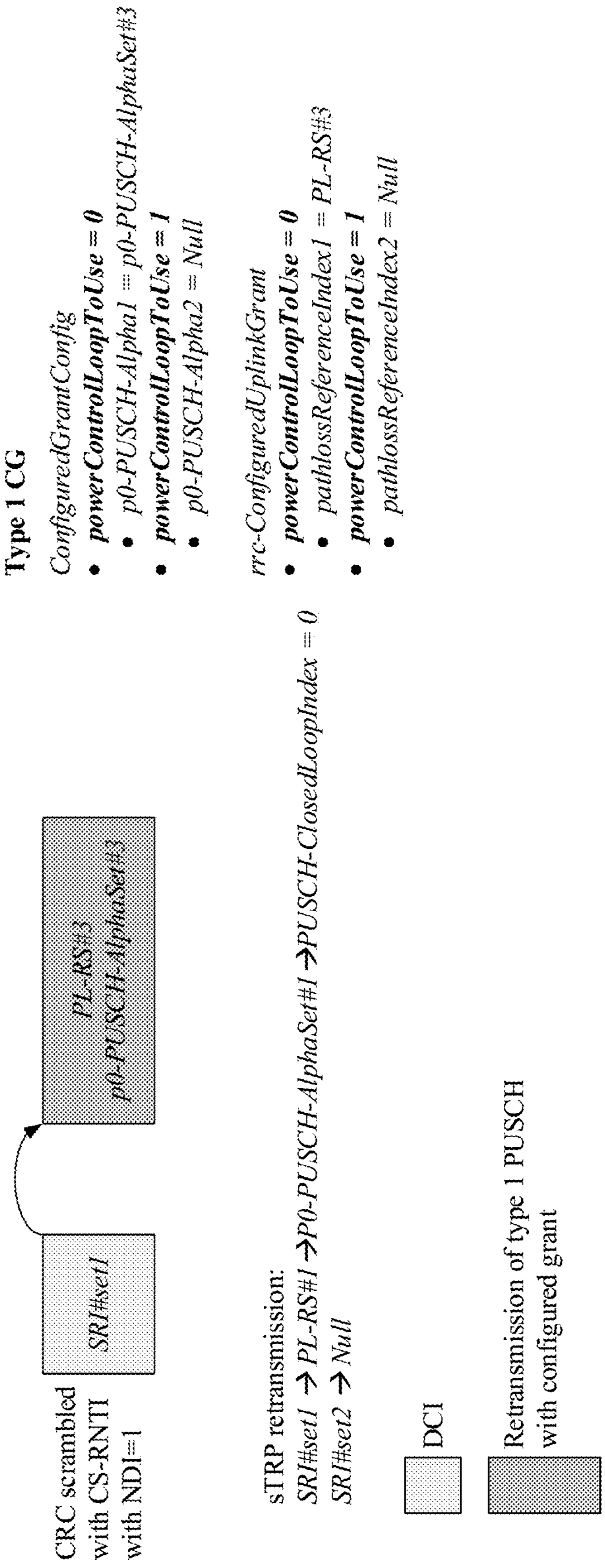
Figure 13:
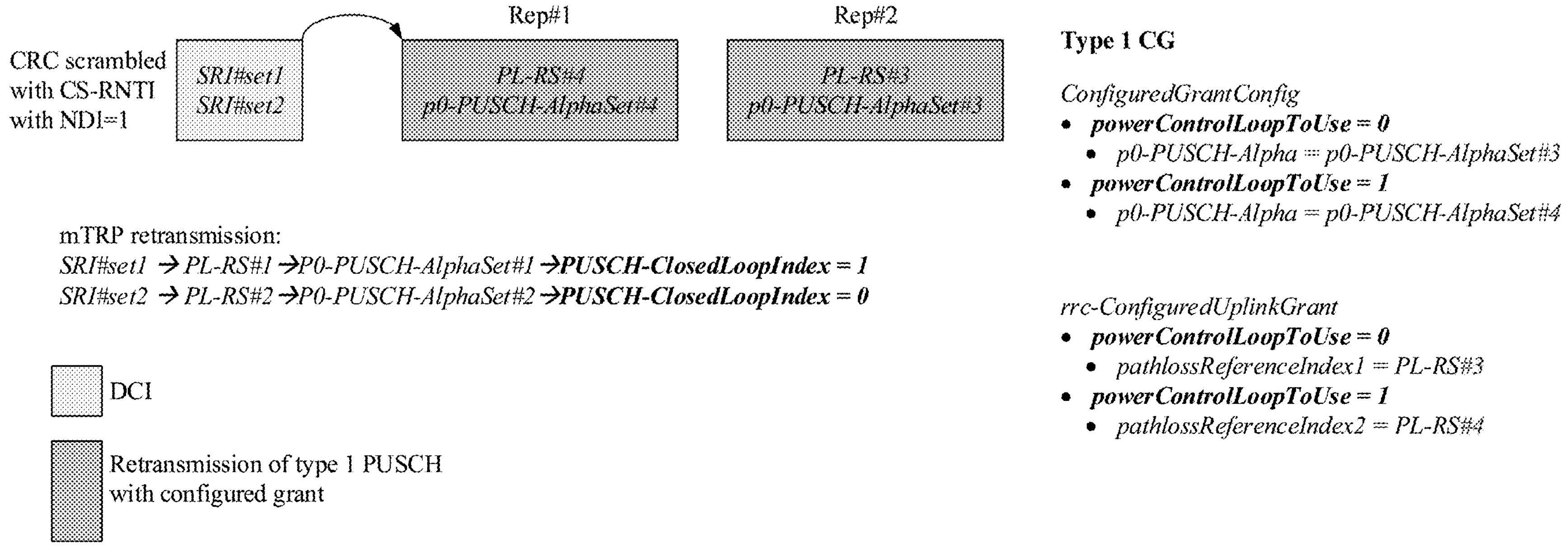
FIGS. 13 and 14 are schematic diagrams of uplink data transmission under type 1 CG configuration corresponding to the scenario in FIG. 3.
Figure 14:
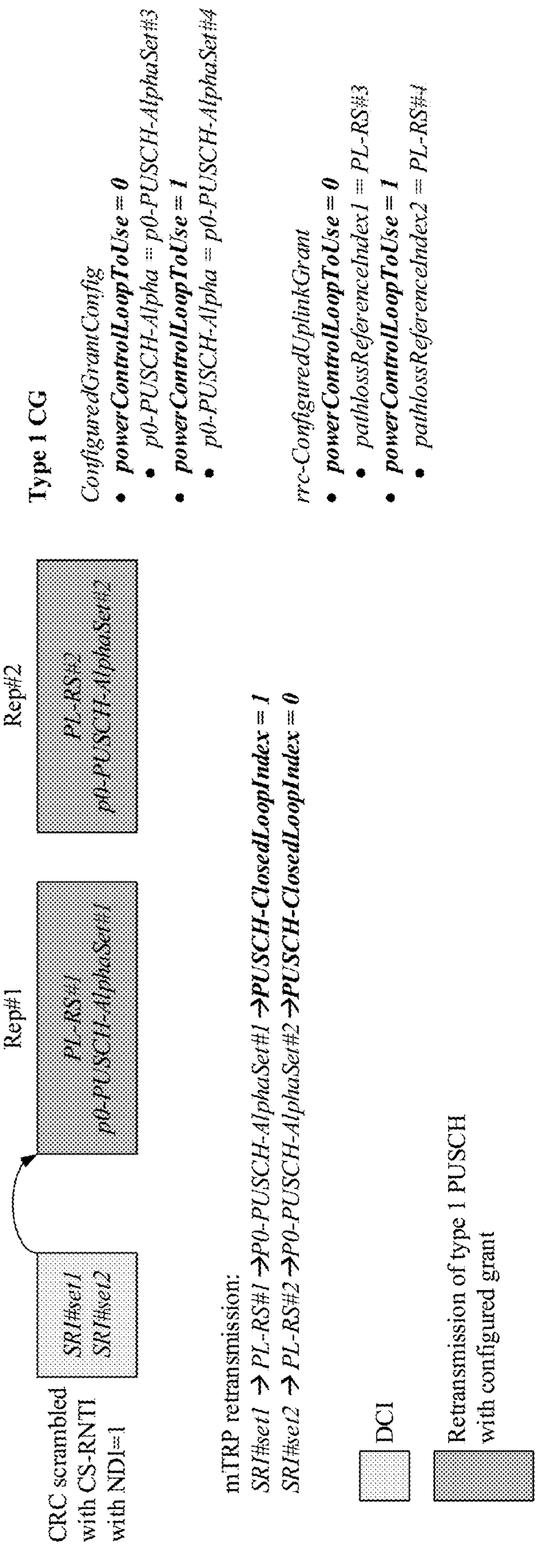

FIGS. 7-16 are schematic diagrams of 10 implementations under type 1 configured grant, wherein FIGS. 7-9 correspond to scenario 1, FIGS. 10-12 correspond to scenario 2, FIGS. 13 and 14 correspond to scenario 3, and FIGS. 15 and 16 correspond to scenario 4. In the examples shown in FIGS. 7-16, on the active BWP to which transmitting the PUSCH retransmission corresponds, the terminal equipment is configured with two SRS resource sets used for PUSCH transmission, i.e. the first SRS resource set and the second SRS resource set. In addition, in the examples shown in FIGS. 7-16, a parameter PUSCH-ClosedLoopindex is used to indicate a power control loop index or is used to indicate a closed power control loop index, and a parameter powerControlLoopToUse is used to indicate a power control loop index.

In the example in FIG. 7, for PUSCH retransmission associated with identical closed-loop indices, it is transmitted by using the power control parameter in the CG (the above-described first power control parameter), and the power control parameter indicated by DCI (the second power control parameter) is used to transmit other PUSCH retransmissions.

As shown in FIG. 7, in this example, the configured grant configuration is type 1 CG. The type 1 CG includes ConfiguredGrantConfig and rrc-ConfiguredUplinkGrant. A power control parameter group is configured in ConfiguredGrantConfig, including p0 and Alpha (p0 PUSCH-AlphaSet #3), and an ID of a power control loop to which the power control parameter group corresponds is 0; and ConfiguredGrantConfig is not configured with a power control parameter group with an ID of a corresponding power control loop being 1. A pathloss reference signal (PL-RS #3) is configured in rrc-ConfiguredUplinkGrant, and an ID of a power control loop to which the pathloss reference signal corresponds is 0; and rrc-ConfiguredUplinkGrant is not configured with a power control parameter group with an ID of a corresponding power control loop being 1.

As shown in FIG. 7, in this example, CRC of a PDCCH scheduling the retransmission of the PUSCH with configured grant is scrambled by a CS-RNTI, and an NDI field contained in the DCI to which the PDCCH corresponds is 1. The DCI to which the PDCCH corresponds includes SRI #set1 and SRI #set2.

In the embodiments, SRI #set1 may explicitly indicate (an indication of an SRI domain), which indicates an SRS resource in the first SRS resource set (corresponding to TRP #1). SRI #set1 may also implicitly indicate, which indicates an SRS resource in the first SRS resource set. For example, when the first SRS resource set contains only one SRS resource, there is no corresponding SRI field; and when the UE receives the PDCCH, it means that the UE needs to perform uplink data transmission according to the SRS resource in the first SRS resource set. SRI #set1 is associated with a PL-RS (PL-RS #1), that is, PL-RS #1 is a pathloss reference signal associated with the first SRS resource set; or, PL-RS #1 is a pathloss reference signal associated with an SRS resource selected in the first SRS resource set, and a power control loop ID to which the pathloss reference signal corresponds is 1. In addition, SRI #set1 is also associated with a power control parameter group, which includes p0 and Alpha, i.e. p0-PUSCH-AlphaSet #1, and an ID of a power control loop to which the power control parameter group corresponds is 1. In addition, a power control loop ID to which SRI #set1 corresponds is 1.

In the embodiments, SRI #set2 may explicitly indicate (an indication of an SRI domain), which indicates an SRS resource in the second SRS resource set (corresponding to TRP #2). SRI #set2 may also implicitly indicate, which indicates an SRS resource in the second SRS resource set. For example, when the second SRS resource set contains only one SRS resource, there is no corresponding SRI field; and when the UE receives the PDCCH, it means that the UE needs to perform uplink data transmission according to the SRS resource in the second SRS resource set. SRI #set2 is associated with a PL-RS (PL-RS #2), that is, PL-RS #2 is a pathloss reference signal associated with the second SRS resource set; or, PL-RS #2 is a pathloss reference signal associated with an SRS resource selected in the second SRS resource set, and a power control loop ID to which the pathloss reference signal corresponds is 0. In addition, SRI #set2 is also associated with a power control parameter group, which includes p0 and Alpha, i.e. p0-PUSCH-AlphaSet #2, and an ID of a power control loop to which the power control parameter group corresponds is 0. In addition, a power control loop ID to which SRI #set2 corresponds is 0.

As shown in FIG. 7, in this example, the retransmission of the PUSCH with configured grant consists of two parts, which have identical data bits, or in other words, the retransmission of the PUSCH is repeated, i.e. Rep #1 and Rep #2. In this example, Rep #1 corresponds to a PUSCH part transmitted to TRP #1, and Rep #2 corresponds to a PUSCH part transmitted to TRP #2, and they are transmitted by using independent power control parameters.

As shown in FIG. 7, SRI #set1 is used to indicate Rep #1, and correspondingly, a power control loop ID to which Rep #1 corresponds is 1. As a power control parameter related to power control loop ID=1 is not configured in the CG configuration, Rep #1 is transmitted by using the power control parameter indicated by the scheduling DCI, that is, the PUSCH Rep #1 is transmitted according to power control parameters p0-PUSCH-AlphaSet #1 and PL-RS #1.

As shown in FIG. 7, SRI #set2 is used to indicate Rep #2, and correspondingly, a power control loop ID to which Rep #2 corresponds is 0. As a power control parameter related to power control loop ID=0 is configured in the CG configuration, Rep #2 is transmitted by using a power control parameter in the CG configuration corresponding to power control loop ID=0, that is, the PUSCH Rep #2 is transmitted according to power control parameters p0-PUSCH-AlphaSet #3 and PL-RS #3.

In the example in FIG. 8, for all PUSCH retransmissions, they are transmitted by using the power control parameter indicated by the DCI (the above third power control parameter).

As shown in FIG. 8, in this example, the configured grant configuration, the PDCCH scheduling the retransmission of the PUSCH with configured grant and the retransmission of the PUSCH with configured grant are identical to those in FIG. 7, which shall not be repeated herein any further.

As shown in FIG. 8, SRI #set1 is used to indicate Rep #1, and correspondingly, a power control loop ID to which Rep #1 corresponds is 1. In this example, the retransmission of the PUSCH is unrelated to a power control parameter configured in the CG configuration, that is, Rep #1 is transmitted by using the power control parameter indicated by the scheduling DCI, that is, the PUSCH Rep #1 is transmitted according to power control parameters p0-PUSCH-AlphaSet #1 and PL-RS #1.

As shown in FIG. 8, SRI #set2 is used to indicate Rep #2, and correspondingly, a power control loop ID to which Rep #2 corresponds is 0. In this example, the retransmission of the PUSCH is unrelated to a power control parameter configured in the CG configuration, that is, Rep #2 is transmitted by using the power control parameter indicated by the scheduling DCI, that is, the PUSCH Rep #2 is transmitted according to power control parameters p0-PUSCH-AlphaSet #2 and PL-RS #2.

In the example in FIG. 9, for all PUSCH retransmissions, they are transmitted by using the power control parameter in the CG configuration (the above first power control parameter).

As shown in FIG. 9, in this example, the configured grant configuration, the PDCCH scheduling the retransmission of the PUSCH with configured grant and the retransmission of the PUSCH with configured grant are identical to those in FIG. 7, which shall not be repeated herein any further. In the embodiments, what is different from FIG. 7 is that Rep #1 and Rep #2 are transmitted by using identical power control parameters provided by the configured grant configuration.

As shown in FIG. 9, SRI #set1 is used to indicate Rep #1, and correspondingly, a power control loop ID to which Rep #1 corresponds is 1. In this example, the retransmission of the PUSCH is transmitted only according to the power control parameter configured in the configured grant configuration, that is, Rep #1 is transmitted by using the power control parameter scheduling the CG configuration, that is, the PUSCH Rep #1 is transmitted according to power control parameters p0-PUSCH-AlphaSet #3 and PL-RS #3.

As shown in FIG. 9, SRI #set2 is used to indicate Rep #2, and correspondingly, a power control loop ID to which Rep #2 corresponds is 0. In this example, the retransmission of the PUSCH is transmitted only according to the power control parameter configured in the CG configuration, that is, Rep #2 is transmitted by using the power control parameter scheduling the CG configuration, that is, the PUSCH Rep #2 is transmitted according to power control parameters p0-PUSCH-AlphaSet #3 and PL-RS #3.

In the example in FIG. 10, for all PUSCH retransmissions, they are transmitted by using the power control parameter indicated by the DCI (the above third power control parameter).

As shown in FIG. 10, in this example, the configured grant configuration is identical to that in FIG. 7, which shall not be repeated herein any further.

As shown in FIG. 10, in this example, the CRC of the PDCCH scheduling the retransmission of the PUSCH with configured grant is scrambled by a CS-RNTI, and an NDI field contained in the DCI to which the PDCCH corresponds is 1. The DCI to which the PDCCH corresponds includes SRI #set1.

In the embodiments, the indication for SRI #set1 is identical to that in FIG. 7, which shall not be repeated herein any further. Furthermore, what is different from the example in FIG. 7 is that there is no indication for SRI #set2 in the DCI.

As shown in FIG. 10, in this example, as corresponding to single TRP transmission, the retransmission of the PUSCH with configured grant only consists of one part. In the embodiments, SRI #set1 is used to indicate the PUSCH retransmission, and correspondingly, a power control loop ID to which the PUSCH retransmission corresponds is 1. In this example, due to that there is no configuration with a corresponding power control loop ID of 1 (null) in the CG configuration, the retransmission of the PUSCH is transmitted according to the power control parameter indicated by the DCI, that is, the PUSCH retransmission is transmitted according to power control parameters p0-PUSCH-AlphaSet #1 and PL-RS #1.

In the example in FIG. 11, for all PUSCH retransmissions, they are transmitted by using the power control parameter in the CG configuration (the above first power control parameter).

As shown in FIG. 11, in this example, the configured grant configuration is identical to that in FIG. 7, which shall not be repeated herein any further.

As shown in FIG. 11, in this example, the CRC of the PDCCH scheduling the retransmission of the PUSCH with configured grant is scrambled by a CS-RNTI, and an NDI field contained in the DCI to which the PDCCH corresponds is 1. The DCI to which the PDCCH corresponds includes SRI #set1.

In the embodiments, the indication for SRI #set1 is identical to that in FIG. 7, which shall not be repeated herein any further. Furthermore, what is different from the example in FIG. 7 is that there is no indication for SRI #set2 in the DCI.

As shown in FIG. 11, in this example, as corresponding to single TRP transmission, the retransmission of the PUSCH with configured grant only consists of one part. In the embodiments, SRI #set1 is used to indicate the PUSCH retransmission, and correspondingly, a power control loop ID to which the PUSCH retransmission corresponds is 1. In this example, although there is no configuration with a corresponding power control loop ID of 1 (null) in the CG configuration, the retransmission of the PUSCH is transmitted according to the power control parameter in the CG configuration, that is, the PUSCH retransmission is transmitted according to power control parameters p0-PUSCH-AlphaSet #3 and PL-RS #3.

In the example in FIG. 12, for all PUSCH retransmissions, they are transmitted by using the power control parameter in the CG configuration (the above first power control parameter). What is different from the example in FIG. 11 is that all the PUSCH retransmissions and the CG configuration are associated with identical closed-loop indices.

As shown in FIG. 12, in this example, the configured grant configuration is identical to that in FIG. 7, which shall not be repeated herein any further.

As shown in FIG. 12, in this example, the CRC of the PDCCH scheduling the retransmission of the PUSCH with configured grant is scrambled by a CS-RNTI, and an NDI field contained in the DCI to which the PDCCH corresponds is 1. The DCI to which the PDCCH corresponds includes SRI #set1.

In the embodiments, the indication for SRI #set1 is identical to that in FIG. 7, which shall not be repeated herein any further. Furthermore, what is different from the example in FIG. 7 is that there is no indication for SRI #set2 in the DCI.

As shown in FIG. 12, in this example, as corresponding to single TRP transmission, the retransmission of the PUSCH with configured grant consists of one part. In the embodiments, SRI #set1 is used to indicate the PUSCH retransmission, and correspondingly, a power control loop ID to which the PUSCH retransmission corresponds is 0. In this example, as a power control parameter related to power control loop ID=0 is configured in the CG configuration, the retransmission of the PUSCH is transmitted by using the power control parameter corresponding to power control loop ID=0 in the CG configuration, that is, the PUSCH retransmission is transmitted according to power control parameters p0-PUSCH-AlphaSet #3 and PL-RS #3.

In the example in FIG. 13, for all PUSCH retransmissions, they are transmitted by using the power control parameter in the CG configuration (the above first power control parameter) according to the closed-loop indices.

As shown in FIG. 13, in this example, the configured grant configuration is type 1 CG. The type 1 CG includes ConfiguredGrantConfig and rrc-ConfiguredUplinkGrant. Two power control parameter groups are configured in ConfiguredGrantConfig. One of the power control parameter groups includes p0 and Alpha (p0-PUSCH-AlphaSet #3), and an ID of a power control loop to which the power control parameter group corresponds is 0; and the other power control parameter group includes p0 and Alpha (p0-PUSCH-AlphaSet #4), and an ID of a power control loop to which the power control parameter group corresponds is 1. A pathloss reference signal (PL-RS #3) corresponding to the power control loop with an ID of 0 and a pathloss reference signal (PL-RS #4) corresponding to the power control loop with an ID of 1 are configured in rrc-ConfiguredUplinkGrant.

As shown in FIG. 13, in this example, the PDCCH scheduling the retransmission of the PUSCH with configured grant and the retransmission of the PUSCH with configured grant are identical to those in FIG. 7, which shall not be repeated herein any further.

As shown in FIG. 13, SRI #set1 is used to indicate Rep #1, and correspondingly, a power control loop ID to which Rep #1 corresponds is 1. In this example, the retransmission of the PUSCH is transmitted according to the power control parameters (with identical power control loop IDs) configured in the CG configuration, that is, Rep #1 is transmitted by using the power control parameters in the CG configuration corresponding to power control loop ID=1, that is, PUSCH Rep #1 is transmitted according to the power control parameters p0-PUSCH-AlphaSet #4 and PL-RS #4.

As shown in FIG. 13, SRI #set2 is used to indicate Rep #2, and correspondingly, a power control loop ID to which Rep #2 corresponds is 0. In this example, the retransmission of the PUSCH is transmitted according to the power control parameters (with identical power control loop IDs) configured in the CG configuration, that is, Rep #2 is transmitted by using the power control parameters in the CG configuration corresponding to power control loop ID=1, that is, the PUSCH Rep #2 is transmitted according to the power control parameters p0-PUSCH-AlphaSet #3 and PL-RS #3.

In the example in FIG. 14, for all PUSCH retransmissions, they are transmitted by using the power control parameter indicated by the DCI (the above third power control parameter).

As shown in FIG. 14, in this example, the configured grant configuration, the PDCCH scheduling the retransmission of the PUSCH with configured grant and the retransmission of the PUSCH with configured grant are identical to those in FIG. 13, which shall not be repeated herein any further.

As shown in FIG. 14, SRI #set1 is used to indicate Rep #1, and correspondingly, a power control loop ID to which Rep #1 corresponds is 1. In this example, the PUSCH retransmission (Rep #1) is transmitted according to the power control parameters indicated by the DCI, that is, it is transmitted according to the power control parameters p0-PUSCH-AlphaSet #1 and PL-RS #1.

As shown in FIG. 14, SRI #set2 is used to indicate Rep #2, and correspondingly, a power control loop ID to which Rep #2 corresponds is 0. In this example, the PUSCH retransmission (Rep #2) is transmitted according to the power control parameters indicated by the DCI, that is, it is transmitted according to the power control parameters p0-PUSCH-AlphaSet #2 and PL-RS #2.

In the example in FIG. 15, for all PUSCH retransmissions, they are transmitted by using the power control parameter in the configured grant configuration (the above first power control parameter) according to closed-loop indices.

As shown in FIG. 15, in this example, the configured grant configuration and the retransmission of the PUSCH with configured grant are identical to those in FIG. 13, and the PDCCH scheduling the retransmission of the PUSCH with configured grant is identical to that in FIG. 10, which shall not be repeated herein any further.

As shown in FIG. 15, SRI #set1 is used to indicate the PUSCH retransmission, and a corresponding power control loop ID is 1. In this example, as the CG configuration has configuration with a corresponding power control loop ID of 1, the retransmission of the PUSCH is transmitted according to the power control parameters (with a corresponding power control loop ID of 1) in the CG configuration, that is, it is transmitted according to the power control parameters p0-PUSCH-AlphaSet #4 and PL-RS #4.

In the example in FIG. 16, for all PUSCH retransmissions, they are transmitted according to the power control parameter indicated by the DCI (the above third power control parameter).

As shown in FIG. 16, in this example, the configured grant configuration and the retransmission of the PUSCH with configured grant are identical to those in FIG. 13, and the PDCCH scheduling the retransmission of the PUSCH with configured grant is identical to that in FIG. 10, which shall not be repeated herein any further.

As shown in FIG. 16, SRI #set1 is used to indicate the PUSCH retransmission, and a corresponding power control loop ID is 1. In this example, although the CG configuration has configuration with a corresponding power control loop ID of 1, the retransmission of the PUSCH is transmitted according to the power control parameters indicated by the DCI, that is, it is transmitted according to the power control parameters p0-PUSCH-AlphaSet #1 and PL-RS #1.

Figure 17:
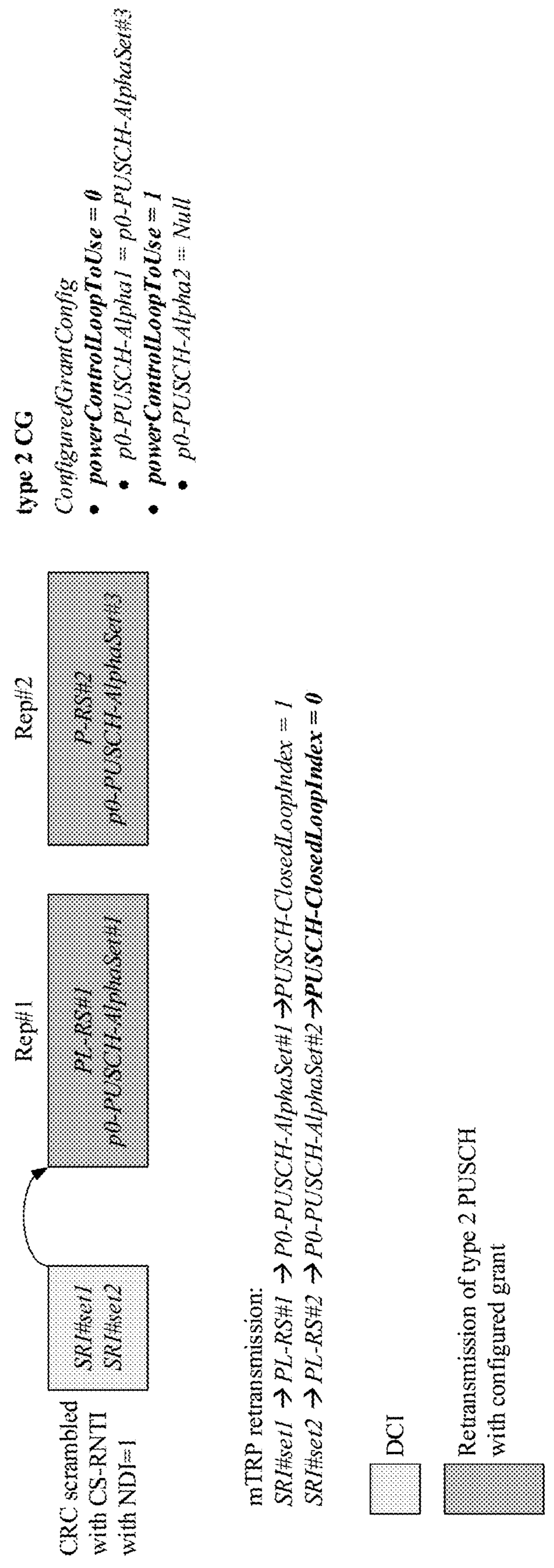
FIGS. 17-19 are schematic diagrams of uplink data transmission under type 2 CG configuration corresponding to the scenario in FIG. 1.
Figure 18:
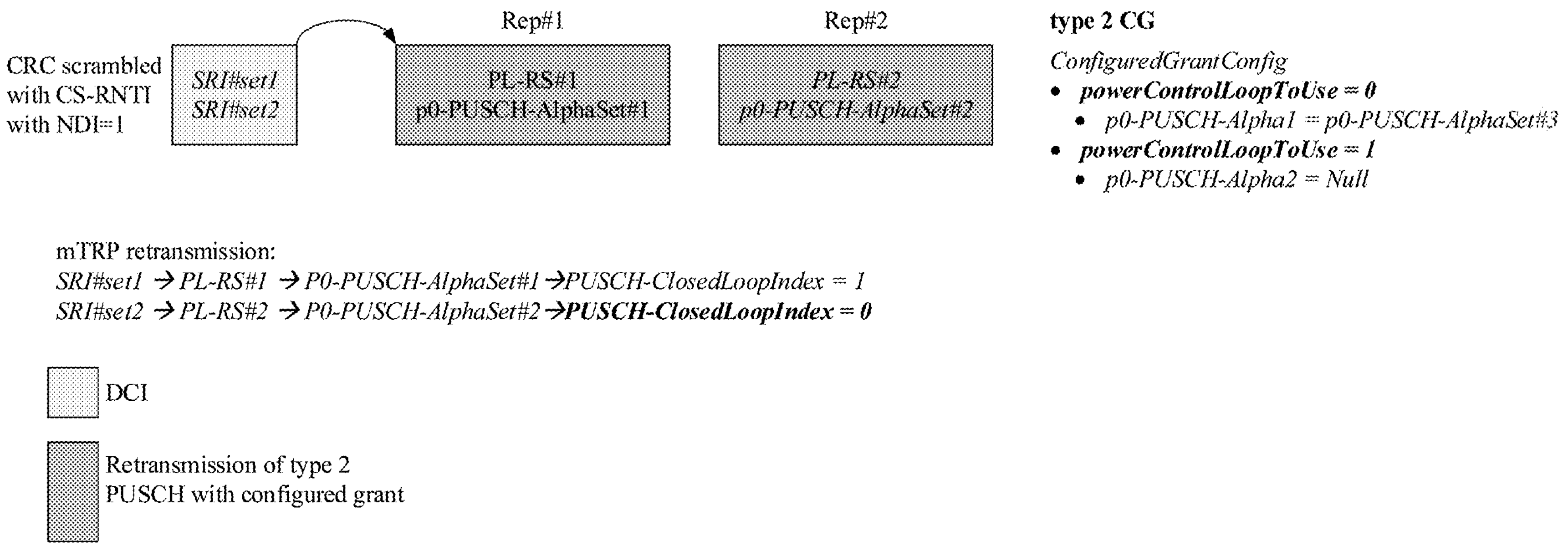
Figure 19:
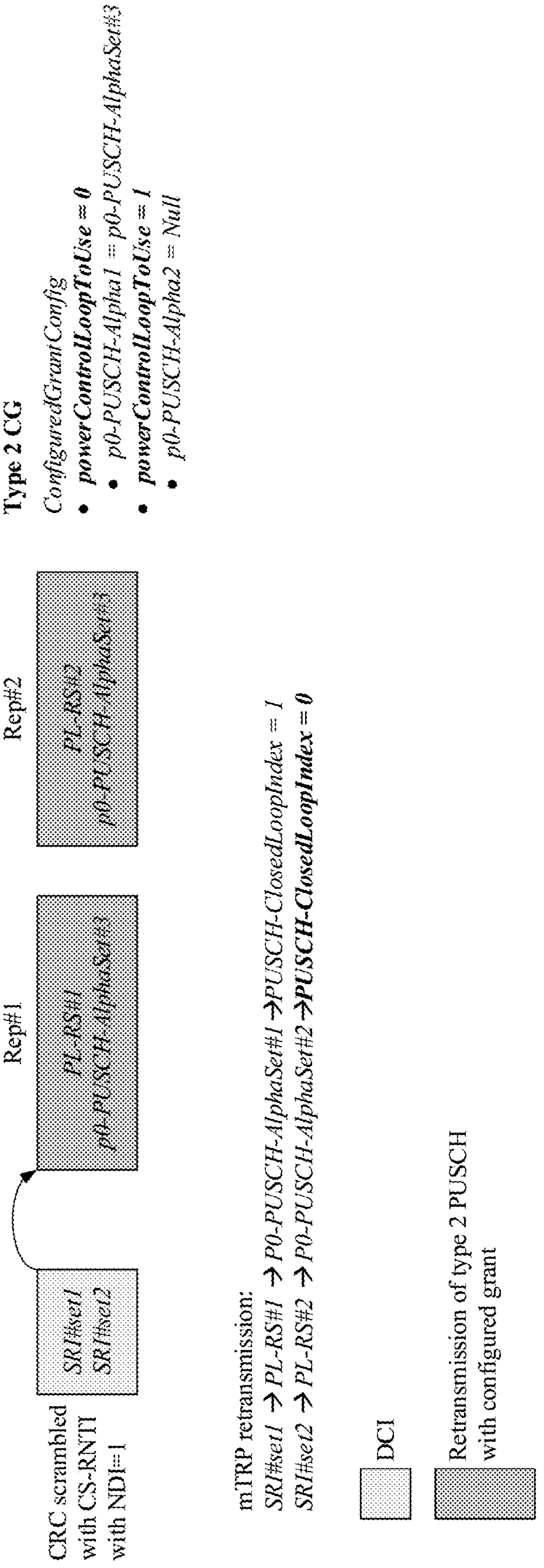
Figure 20:
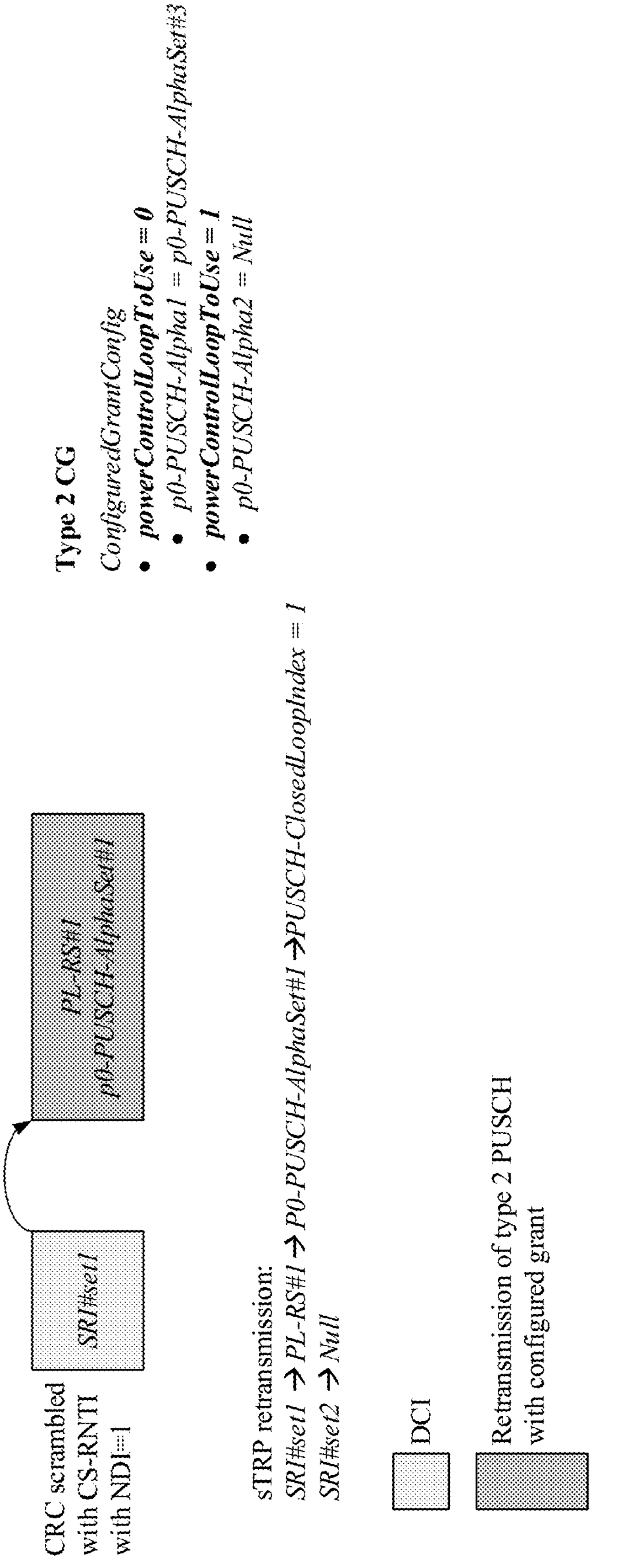
FIGS. 20-22 are schematic diagrams of uplink data transmission under type 2 CG configuration corresponding to the scenario in FIG. 2.
Figure 21:
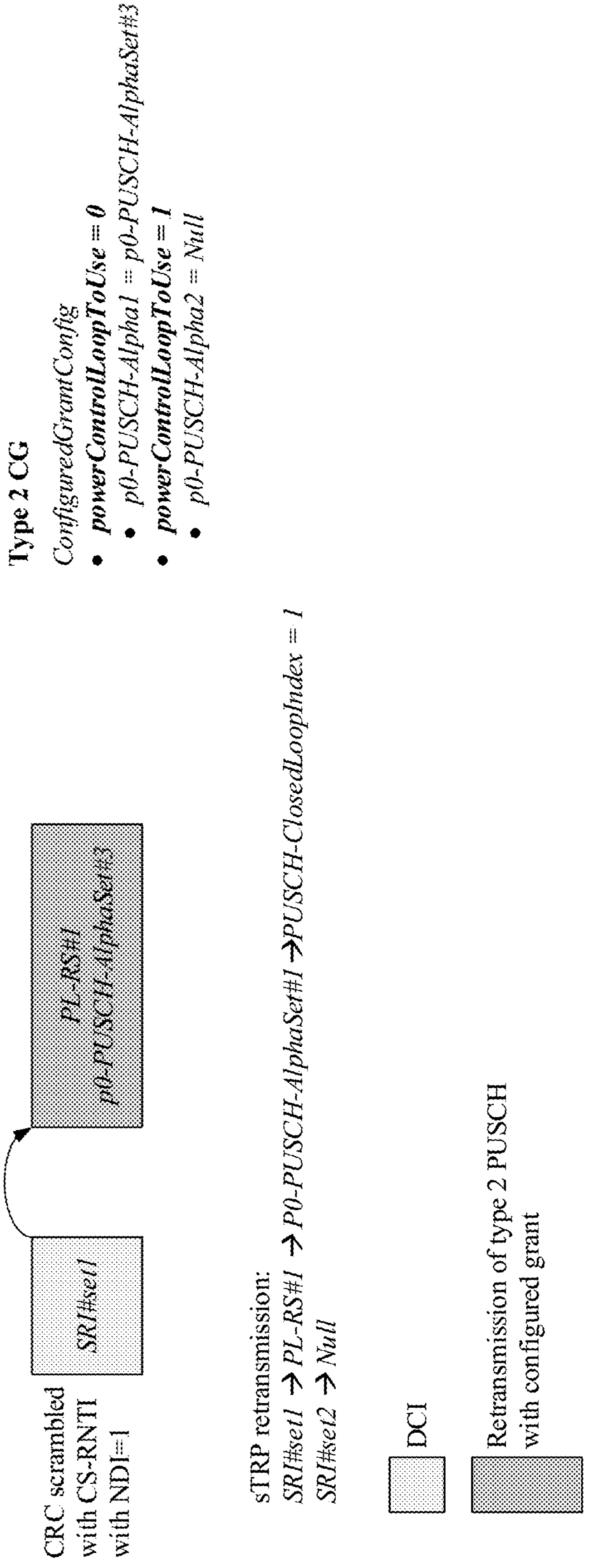
Figure 22:
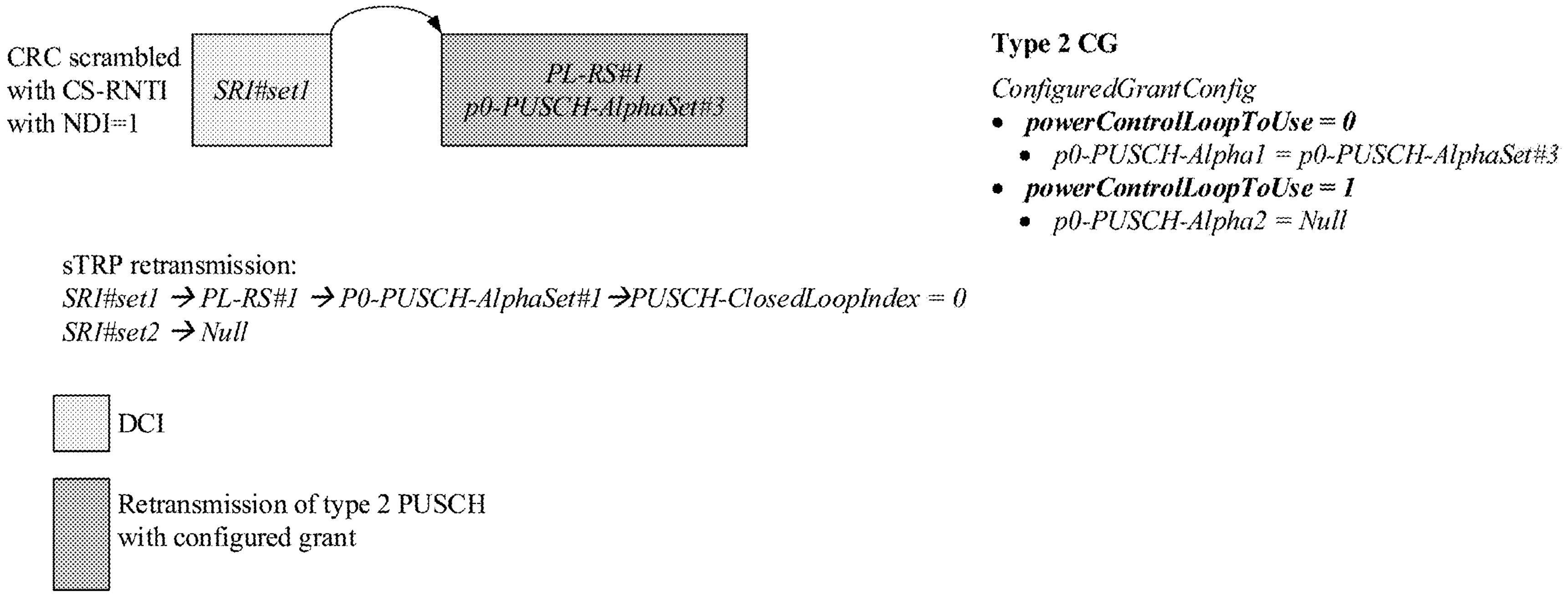
Figure 23:
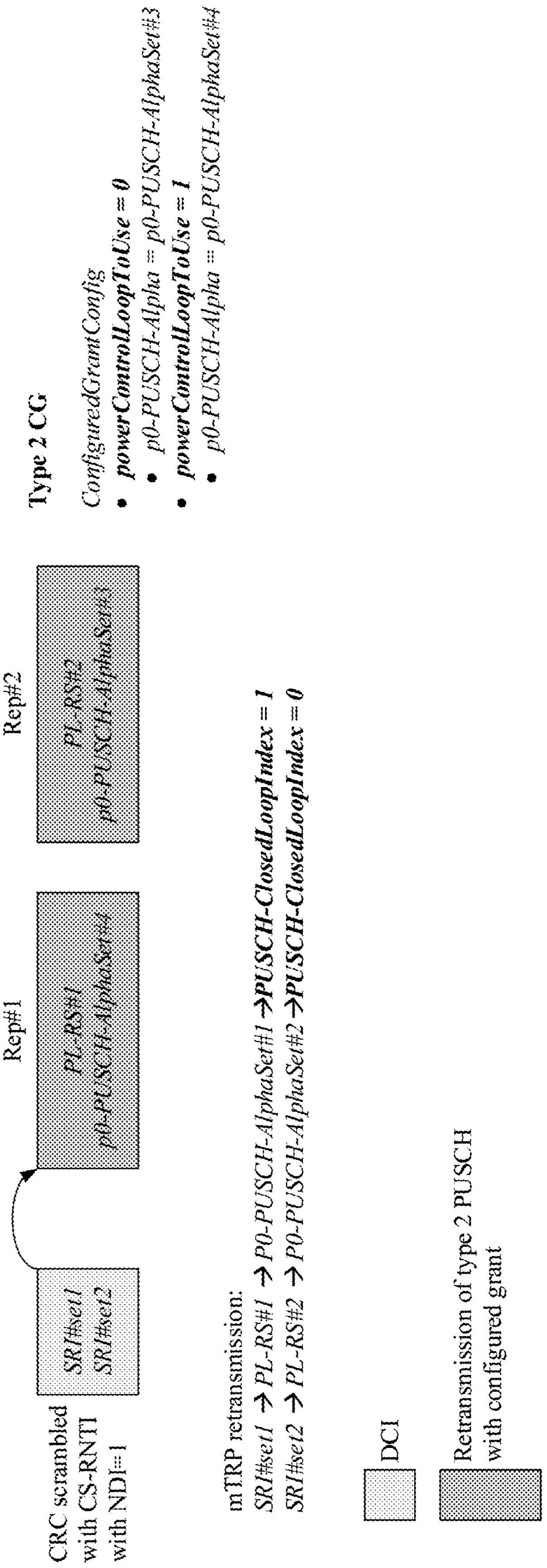
FIGS. 23 and 24 are schematic diagrams of uplink data transmission under type 2 CG configuration corresponding to the scenario in FIG. 3.
Figure 24:
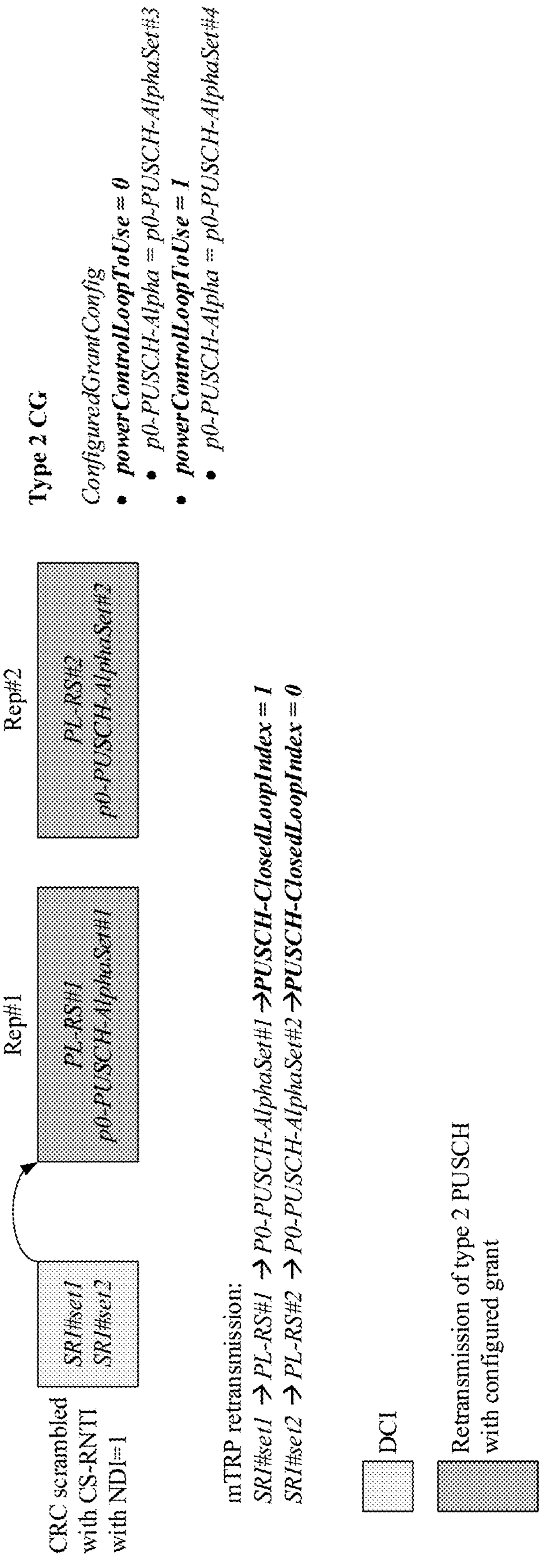
Figure 25:
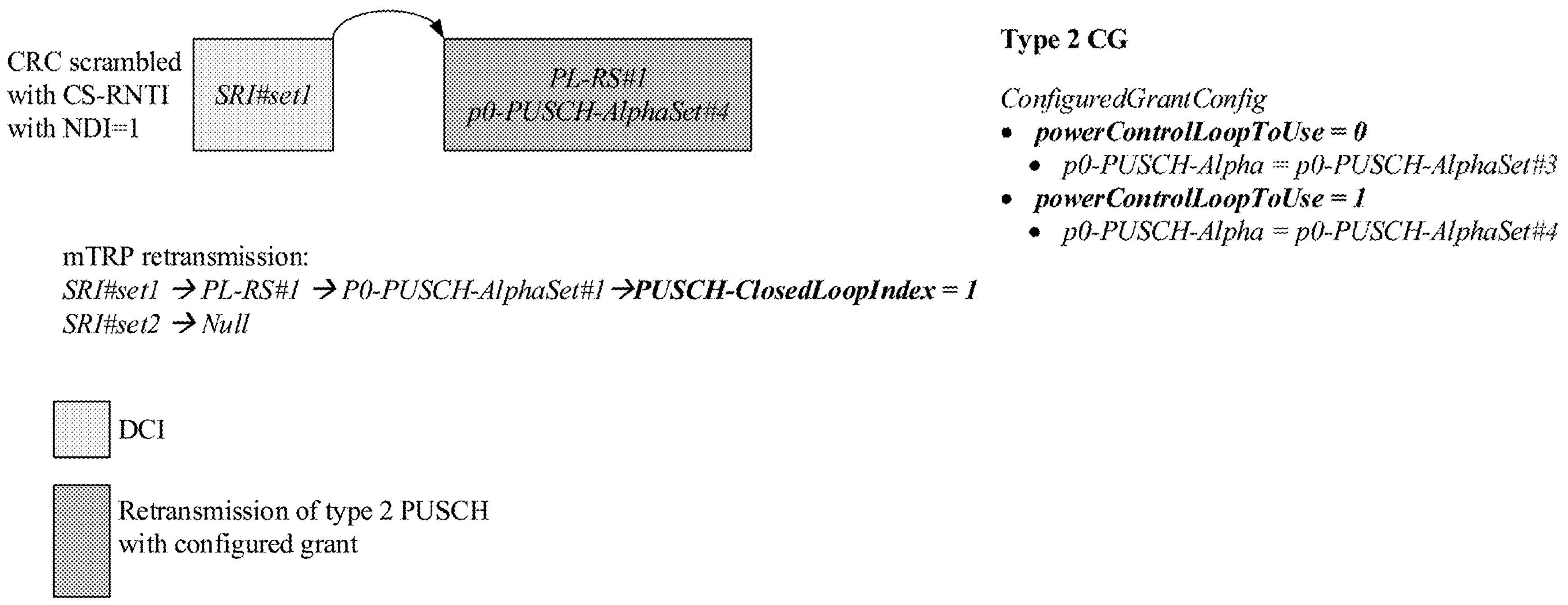
FIGS. 25 and 26 are schematic diagrams of uplink data transmission under type 2 CG configuration corresponding to the scenario in FIG. 4.
Figure 26:
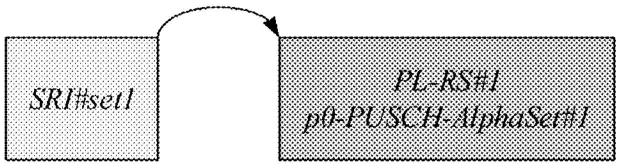

FIGS. 17-26 are schematic diagrams of 10 implementations under type 2 configured grant, wherein FIGS. 17-19 correspond to scenario 1, FIGS. 20-22 correspond to scenario 2, FIGS. 23 and 24 correspond to scenario 3, and FIGS. 25 and 26 correspond to scenario 4. In the examples shown in FIGS. 17-26, on the active BWP to which transmitting the PUSCH retransmission corresponds, the terminal equipment is configured with two SRS resource sets for PUSCH transmission, i.e. the first SRS resource set and the second SRS resource set. In addition, in the examples shown in FIGS. 17-26, a parameter PUSCH-ClosedLoopindex is used to indicate a power control loop index or is used to indicate a closed power control loop index, and a parameter powerControlLoopToUse is used to indicate a power control loop index.

In the example in FIG. 17, for PUSCH retransmission associated with identical closed-loop indices, it is transmitted by using the power control parameter in the CG (the above-described first power control parameter), and the power control parameter indicated by the DCI (the second power control parameter) is used to transmit other PUSCH retransmissions.

As shown in FIG. 17, in this example, the configured grant configuration is type 2 CG. The type 2 CG includes ConfiguredGrantConfig. A power control parameter group is configured in ConfiguredGrantConfig, including p0 and Alpha (p0 PUSCH-AlphaSet #3), and an ID of a power control loop to which the power control parameter group corresponds is 0; and ConfiguredGrantConfig is not configured with a power control parameter group with an ID of a corresponding power control loop being 1.

As shown in FIG. 17, in this example, CRC of a PDCCH scheduling the retransmission of the PUSCH with configured grant is scrambled by a CS-RNTI, and an NDI field contained in the DCI to which the PDCCH corresponds is 1. The DCI to which the PDCCH corresponds includes SRI #set1 and SRI #set2.

In the embodiments, SRI #set1 may explicitly indicate (an indication of an SRI domain), which indicates an SRS resource in the first SRS resource set (corresponding to TRP #1). SRI #set1 may also implicitly indicate, which indicates an SRS resource in the first SRS resource set. For example, when the first SRS resource set contains only one SRS resource, there is no corresponding SRI field; and when the UE receives the PDCCH, it means that the UE needs to perform uplink data transmission according to the SRS resource in the first SRS resource set. SRI #set1 is associated with a PL-RS (PL-RS #1), that is, PL-RS #1 is a pathloss reference signal associated with the first SRS resource set; or, PL-RS #1 is a pathloss reference signal associated with an SRS resource selected in the first SRS resource set, and a power control loop ID to which the pathloss reference signal corresponds is 1. In addition, SRI #set1 is also associated with a power control parameter group, which includes p0 and Alpha, i.e. p0-PUSCH-AlphaSet #1, and an ID of a power control loop to which the power control parameter group corresponds is 1. In addition, a power control loop ID to which SRI #set1 corresponds is 1.

In the embodiments, SRI #set2 may explicitly indicate (an indication of an SRI domain), which indicates an SRS resource in the second SRS resource set (corresponding to TRP #2). SRI #set2 may also implicitly indicate, which indicates an SRS resource in the second SRS resource set. For example, when the second SRS resource set contains only one SRS resource, there is no corresponding SRI field; and when the UE receives the PDCCH, it means that the UE needs to perform uplink data transmission according to the SRS resource in the second SRS resource set. SRI #set2 is associated with a PL-RS (PL-RS #2), that is, PL-RS #2 is a pathloss reference signal associated with the second SRS resource set; or, PL-RS #2 is a pathloss reference signal associated with an SRS resource selected in the second SRS resource set, and a power control loop ID to which the pathloss reference signal corresponds is 0. In addition, SRI #set2 is also associated with a power control parameter group, which includes p0 and Alpha, i.e. p0-PUSCH-AlphaSet #2, and an ID of a power control loop to which the power control parameter group corresponds is 0. In addition, a power control loop ID to which SRI #set2 corresponds is 0.

As shown in FIG. 17, in this example, the retransmission of the PUSCH with configured grant consists of two parts, which have identical data bits, or in other words, the retransmission of the PUSCH is repeated, i.e. Rep #1 and Rep #2. In this example, Rep #1 corresponds to a PUSCH part transmitted to TRP #1, and Rep #2 corresponds to a PUSCH part transmitted to TRP #2, and they are transmitted by using independent power control parameters.

As shown in FIG. 17, SRI #set1 is used to indicate Rep #1, and correspondingly, a power control loop ID to which Rep #1 corresponds is 1. As a power control parameter related to power control loop ID=1 is not configured in the CG configuration, Rep #1 is transmitted by using the power control parameter indicated by the scheduling DCI, that is, PUSCH Rep #1 is transmitted according to a power control parameter p0-PUSCH-AlphaSet #1.

As shown in FIG. 17, SRI #set2 is used to indicate Rep #2, and correspondingly, a power control loop ID to which Rep #2 corresponds is 0. As a power control parameter related to power control loop ID=0 is configured in the CG configuration, Rep #2 is transmitted by using a power control parameter in the CG configuration corresponding to power control loop ID=O, that is, the PUSCH Rep #2 is transmitted according to power control parameter p0-PUSCH-AlphaSet #3.

As shown in FIG. 17, as type 2 CG is unable to indicate a PL-RS via RRC signaling, Rep #1 and Rep #2 are transmitted respectively according to the indication of the DCI, i.e. according to PL-RS #1 and PL-RS #2.

In the example in FIG. 18, for all PUSCH retransmissions, they are transmitted by using the power control parameter indicated by the DCI (the above third power control parameter).

As shown in FIG. 18, in this example, the configured grant configuration, the PDCCH scheduling the retransmission of the PUSCH with configured grant and the retransmission of the PUSCH with configured grant are identical to those in FIG. 17, which shall not be repeated herein any further.

As shown in FIG. 18, SRI #set1 is used to indicate Rep #1, and correspondingly, a power control loop ID to which Rep #1 corresponds is 1. In this example, the retransmission of the PUSCH is unrelated to a power control parameter configured in the CG configuration, that is, Rep #1 is transmitted by using the power control parameter indicated by the scheduling DCI, that is, the PUSCH Rep #1 is transmitted according to a power control parameter p0-PUSCH-AlphaSet #1.

As shown in FIG. 18, SRI #set2 is used to indicate Rep #2, and correspondingly, a power control loop ID to which Rep #2 corresponds is 0. In this example, the retransmission of the PUSCH is unrelated to a power control parameter configured in the CG configuration, that is, Rep #2 is transmitted by using the power control parameter indicated by the scheduling DCI, that is, the PUSCH Rep #2 is transmitted according to a power control parameter p0-PUSCH-AlphaSet #2.

As shown in FIG. 18, as type 2 CG is unable to indicate a PL-RS via RRC signaling, Rep #1 and Rep #2 are transmitted respectively according to the indication of the DCI, i.e. according to PL-RS #1 and PL-RS #2.

In the example in FIG. 19, for all PUSCH retransmissions, they are transmitted by using the power control parameter in the CG configuration (the above first power control parameter).

As shown in FIG. 19, in this example, the configured grant configuration, the PDCCH scheduling the retransmission of the PUSCH with configured grant and the retransmission of the PUSCH with configured grant are identical to those in FIG. 7, which shall not be repeated herein any further.

As shown in FIG. 19, SRI #set1 is used to indicate Rep #1, and correspondingly, a power control loop ID to which Rep

#1 corresponds is 1. In this example, the retransmission of the PUSCH is transmitted only according to the power control parameter configured in the CG configuration, that is, Rep #1 is transmitted by using the power control parameter scheduling the CG configuration, that is, the PUSCH Rep #1 is transmitted according to a power control parameter p0-PUSCH-AlphaSet #3.

As shown in FIG. 19, SRI #set2 is used to indicate Rep #2, and correspondingly, a power control loop ID to which Rep #2 corresponds is 0. In this example, the retransmission of the PUSCH is transmitted only according to the power control parameter configured in the CG configuration, that is, Rep #2 is transmitted by using the power control parameter scheduling the CG configuration, that is, the PUSCH Rep #2 is transmitted according to a power control parameter p0-PUSCH-AlphaSet #3.

As shown in FIG. 19, as type 2 CG is unable to indicate a PL-RS via RRC signaling, Rep #1 and Rep #2 are transmitted respectively according to the indication of the DCI, i.e. according to PL-RS #1 and PL-RS #2.

In the example in FIG. 20, for all PUSCH retransmissions, they are transmitted by using the power control parameter indicated by the DCI (the above third power control parameter).

As shown in FIG. 20, in this example, the configured grant configuration is identical to that in FIG. 17, which shall not be repeated herein any further.

As shown in FIG. 20, in this example, the CRC of the PDCCH scheduling the retransmission of the PUSCH with configured grant is scrambled by a CS-RNTI, and an NDI field contained in the DCI to which the PDCCH corresponds is 1. The DCI to which the PDCCH corresponds includes SRI #set1.

In the embodiments, the indication for SRI #set1 is identical to that in FIG. 17, which shall not be repeated herein any further. Furthermore, what is different from the example in FIG. 17 is that there is no indication for SRI #set2 in the DCI.

As shown in FIG. 20, in this example, as corresponding to single TRP transmission, the retransmission of the PUSCH with configured grant only consists of one part. In the embodiments, SRI #set1 is used to indicate the PUSCH retransmission, and correspondingly, a power control loop ID to which the PUSCH retransmission corresponds is 1. In this example, due to that there is no configuration with a corresponding power control loop ID of 1 (null) in the CG configuration, the PUSCH retransmission is transmitted according to the power control parameter indicated by the DCI, that is, the PUSCH retransmission is transmitted according to power control parameters p0-PUSCH-AlphaSet #1 and PL-RS #1.

In the example in FIG. 21, for all PUSCH retransmissions, they are transmitted by using the power control parameter in the CG configuration (the above first power control parameter).

As shown in FIG. 21, in this example, the configured grant configuration is identical to that in FIG. 17, which shall not be repeated herein any further.

As shown in FIG. 21, in this example, the CRC of the PDCCH scheduling the retransmission of the PUSCH with configured grant is scrambled by a CS-RNTI, and an NDI field contained in the DCI to which the PDCCH corresponds is 1. The DCI to which the PDCCH corresponds includes SRI #set1.

In the embodiments, the indication for SRI #set1 is identical to that in FIG. 17, which shall not be repeated herein any further. Furthermore, what is different from the example in FIG. 17 is that there is no indication for SRI #set2 in the DCI.

As shown in FIG. 21, in this example, as corresponding to single TRP transmission, the retransmission of the PUSCH with configured grant only consists of one part. In the embodiments, SRI #set1 is used to indicate the PUSCH retransmission, and correspondingly, a power control loop ID to which the PUSCH retransmission corresponds is 1. In this example, although there is no configuration with a corresponding power control loop ID of 1 (null) in the CG configuration, the retransmission of the PUSCH is transmitted according to the power control parameter in the CG configuration, that is, the PUSCH retransmission is transmitted according to a power control parameter p0-PUSCH-AlphaSet #3.

As shown in FIG. 21, as type 2 CG is unable to indicate a PL-RS via RRC signaling, the PUSCH retransmission is transmitted according to the indication of the DCI, i.e. according to PL-RS #1.

In the example in FIG. 22, for all PUSCH retransmissions, they are transmitted by using the power control parameter in the CG configuration (the above first power control parameter). What is different from the example in FIG. 21 is that all the PUSCH retransmissions and the CG configuration are associated with identical closed-loop indices.

As shown in FIG. 22, in this example, the configured grant configuration is identical to that in FIG. 17, which shall not be repeated herein any further.

As shown in FIG. 22, in this example, the CRC of the PDCCH scheduling the retransmission of the PUSCH with configured grant is scrambled by a CS-RNTI, and an NDI field contained in the DCI to which the PDCCH corresponds is 1. The DCI to which the PDCCH corresponds includes SRI #set1.

In the embodiments, the indication for SRI #set1 is identical to that in FIG. 17, which shall not be repeated herein any further. Furthermore, what is different from the example in FIG. 17 is that there is no indication for SRI #set2 in the DCI.

As shown in FIG. 22, in this example, as corresponding to single TRP transmission, the retransmission of the PUSCH with configured grant consists of one part. In the embodiments, SRI #set1 is used to indicate the PUSCH retransmission, and correspondingly, a power control loop ID to which the PUSCH retransmission corresponds is 0. In this example, as a power control parameter related to power control loop ID=0 is configured in the CG configuration, the PUSCH the retransmission is transmitted by using the power control parameter corresponding to power control loop ID=0 in the CG configuration, that is, the PUSCH retransmission is transmitted according to a power control parameter p0-PUSCH-AlphaSet #3.

As shown in FIG. 22, as type 2 CG is unable to indicate a PL-RS via RRC signaling, the PUSCH retransmission is transmitted according to the indication of the DCI, i.e. according to PL-RS #1.

In the example in FIG. 23, for all PUSCH retransmissions, they are transmitted by using the power control parameter in the CG configuration (the above first power control parameter) according to the closed-loop indices.

As shown in FIG. 23, in this example, the configured grant configuration is type 2 CG. The type 2 CG includes ConfiguredGrantConfig. Two power control parameter groups are configured in ConfiguredGrantConfig. One of the power control parameter groups includes p0 and Alpha (p0-PUSCH-AlphaSet #3), and an ID of a power control loop to which the power control parameter group corresponds is 0; and the other power control parameter group includes p0 and Alpha (p0-PUSCH-AlphaSet #4), and an ID of a power control loop to which the power control parameter group corresponds is 1.

As shown in FIG. 23, in this example, the PDCCH scheduling the retransmission of the PUSCH with configured grant and the retransmission of the PUSCH with configured grant are identical to those in FIG. 17, which shall not be repeated herein any further.

As shown in FIG. 23, SRI #set1 is used to indicate Rep #1, and correspondingly, a power control loop ID to which Rep #1 corresponds is 1. In this example, the retransmission of the PUSCH is transmitted according to the power control parameters (with identical power control loop IDs) configured in the CG configuration, that is, Rep #1 is transmitted by using the power control parameters in the CG configuration corresponding to power control loop ID=1, that is, the PUSCH Rep #1 is transmitted according to the power control parameters p0-PUSCH-AlphaSet #4 and PL-RS #4.

As shown in FIG. 23, SRI #set2 is used to indicate Rep #2, and correspondingly, a power control loop ID to which Rep #2 corresponds is 0. In this example, the retransmission of the PUSCH is transmitted according to the power control parameters (with identical power control loop IDs) configured in the CG configuration, that is, Rep #2 is transmitted by using the power control parameter in the CG configuration corresponding to power control loop ID=0, that is, the PUSCH Rep #2 is transmitted according to a power control parameter p0-PUSCH-AlphaSet #3.

As shown in FIG. 23, as type 2 CG is unable to indicate a PL-RS via RRC signaling, Rep #1 and Rep #2 are transmitted respectively according to the indication of the DCI, i.e. according to PL-RS #1 and PL-RS #2.

In the example in FIG. 24, for all PUSCH retransmissions, they are transmitted by using the power control parameter indicated by the DCI (the above third power control parameter).

As shown in FIG. 24, in this example, the configured grant configuration, the PDCCH scheduling the retransmission of the PUSCH with configured grant and the retransmission of the PUSCH with configured grant are identical to those in FIG. 23, which shall not be repeated herein any further.

As shown in FIG. 24, SRI #set1 is used to indicate Rep #1, and correspondingly, a power control loop ID to which Rep #1 corresponds is 1. In this example, the PUSCH retransmission (Rep #1) is transmitted according to the power control parameters indicated by the DCI, that is, it is transmitted according to the power control parameters p0-PUSCH-AlphaSet #1 and PL-RS #1.

As shown in FIG. 24, SRI #set2 is used to indicate Rep #2, and correspondingly, a power control loop ID to which Rep #1 corresponds is 0. In this example, the PUSCH retransmission (Rep #2) is transmitted according to the power control parameters indicated by the DCI, that is, it is transmitted according to the power control parameters p0-PUSCH-AlphaSet #2 and PL-RS #2.

In the example in FIG. 25, for all PUSCH retransmissions, they are transmitted by using the power control parameter in the CG configuration (the above first power control parameter) according to closed-loop indices.

As shown in FIG. 25, in this example, the configured grant configuration and the retransmission of the PUSCH with configured grant are identical to those in FIG. 23, and the PDCCH scheduling the retransmission of the PUSCH with configured grant is identical to that in FIG. 20, which shall not be repeated herein any further.

As shown in FIG. 25, SRI #set1 is used to indicate the PUSCH retransmission, and a power control loop ID to which it corresponds is 1. In this example, retransmission of the PUSCH is transmitted according to the power control parameters (with identical power control loop ID) in the CG configuration, that is, it is transmitted according to a power control parameter p0-PUSCH-AlphaSet #4.

As shown in FIG. 25, as type 2 CG is unable to indicate a PL-RS via RRC signaling, the PUSCH retransmission is transmitted according to the indication of the DCI, i.e. according to PL-RS #1.

In the example in FIG. 26, for all PUSCH retransmissions, they are transmitted according to the power control parameter indicated by the DCI (the above third power control parameter).

As shown in FIG. 26, in this example, the configured grant configuration and the retransmission of the PUSCH with configured grant are identical to those in FIG. 23, and the PDCCH scheduling the retransmission of the PUSCH with configured grant is identical to that in FIG. 20, which shall not be repeated herein any further.

As shown in FIG. 26, SRI #set1 is used to indicate the PUSCH retransmission, and a power control loop ID to which it corresponds is 1. In this example, retransmission of the PUSCH is transmitted according to the power control parameters indicated by the DCI, that is, it is transmitted according to power control parameters p0-PUSCH-AlphaSet #1 and PL-RS #1.

According to the method of the embodiment of this disclosure, transmission problems of retransmission of uplink transmission with configured grant are solved, and when an uplink transmission with configured grant fails, the network device may indicate the terminal equipment to perform retransmission of uplink transmission with configured grant in a more reliable uplink transmission mode, thereby enhancing robustness.

Embodiment of a Second Aspect

The embodiment of this disclosure provides an apparatus for transmitting uplink data. The apparatus may be, for example, a terminal equipment, or may be one or more components or assemblies configured in a terminal equipment.

Figure 27:
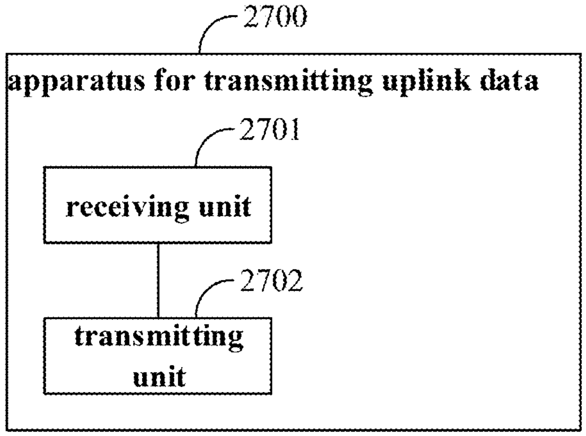
FIG. 27 is a schematic diagram of the apparatus for transmitting uplink data of an embodiment of this disclosure.

FIG. 27 is a schematic diagram of the apparatus for transmitting uplink data of the embodiment of this disclosure. As principles of the apparatus for solving problems are similar to the method in FIG. 5 of the embodiment of the first aspect, reference may be made to the implementation of the method in FIG. 5 of the embodiment of the first aspect for specific implementations of the apparatus, with identical contents being not going to be repeated herein any further.

As shown in FIG. 27, the apparatus 2700 for transmitting uplink data of the embodiment of this disclosure includes:

a receiving unit 2701 configured to receive a PDCCH transmitted by a network device, the PDCCH indicating the terminal equipment to transmit PUSCH retransmission; wherein CRC to which the PDCCH corresponds is scrambled by a CS-RNTI, and an NDI field of the PDCCH is 1; and a transmitting unit 2701 configured to transmit the PUSCH retransmission according to a first power control parameter in a configured grant (CG) configuration to which the PUSCH retransmission corresponds.

In the embodiment of this disclosure, the first power control parameter includes at least one of the following: P0, Alpha, a pathloss reference signal (PL-RS), and a closed-loop index.

In the embodiment of this disclosure, the first power control parameter is related to at least one of the following factors: a power control indication to which the PDCCH corresponds; an SRS resource indication to which the PDCCH corresponds; and an SRS resource set used for PUSCH transmission and configured for the terminal equipment.

In some embodiments, the first power control parameter being related to a power control indication to which the PDCCH corresponds refers to that a closed-loop index to which the first power control parameter corresponds is identical to a closed-loop index indicated by the PDCCH.

In some embodiments, the first power control parameter being related to an SRS resource indication to which the PDCCH corresponds refers to that the first power control parameter is determined according to the SRS resource indication, the SRS resource indication including a first SRS resource indication and/or a second SRS resource indication.

In some embodiments, the first power control parameter being related to an SRS resource set used for PUSCH transmission and configured for the terminal equipment refers to that the first power control parameter is determined according to the number of SRS resource sets configured on an active BWP to which the PUSCH retransmission transmitted by the terminal equipment corresponds.

In some embodiments, the power control indication to which the PDCCH corresponds refers to an indication of at least one of the following power control parameters by the PDCCH: P0, Alpha, a pathloss reference signal (PL-RS), and a closed-loop index.

In some embodiments, the power control indication to which the PDCCH corresponds refers to that one or two groups of power control parameters are indicated by the PDCCH, wherein each group of power control parameters includes at least one of the following: P0, Alpha, a pathloss reference signal (PL-RS), and a closed-loop index.

In some embodiments, the SRS resource indication to which the PDCCH corresponds refers to indication(s) for the first SRS resource set and/or the second SRS resource set by the PDCCH, wherein the first SRS resource set is used for PUSCH transmission, and the second SRS resource set is used for PUSCH transmission.

In some embodiments, the SRS resource indication to which the PDCCH corresponds refers to a first SRS resource indication and/or a second SRS resource indication.

In some embodiments, the SRS resource set used for PUSCH transmission and configured for the terminal equipment refers to one or two SRS resource sets configured on an active BWP to which the PUSCH retransmission transmitted by the terminal equipment corresponds.

In some embodiments, the transmitting unit 2702 further transmits the PUSCH retransmission according to a second power control parameter, the second power control parameter referring to a parameter in UE-specific PUSCH configuration information.

In some embodiments, the second power control parameter includes at least one of the following: P0, Alpha, a pathloss reference signal (PL-RS), and a closed-loop index.

In some embodiments, the second power control parameter is related to at least one of the following factors: a power control indication to which the PDCCH corresponds; an SRS resource indication to which the PDCCH corresponds; an SRS resource set used for PUSCH transmission and configured for the terminal equipment.

Figure 28:
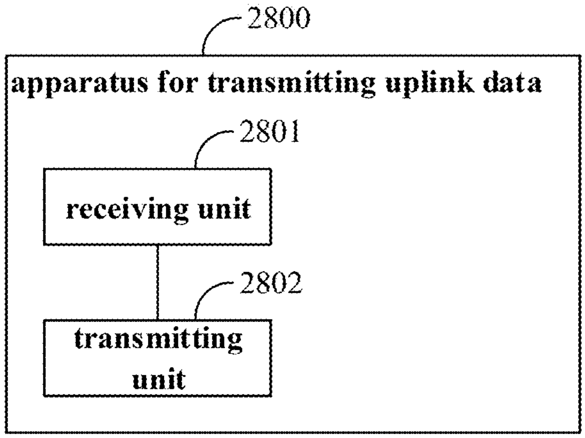
FIG. 28 is another schematic diagram of the apparatus for transmitting uplink data of the embodiment of this disclosure.

FIG. 28 is another schematic diagram of the apparatus for transmitting uplink data of the embodiment of this disclosure. As principles of the apparatus for solving problems are similar to the method in FIG. 6 of the embodiment of the first aspect, reference may be made to the implementation of the method in FIG. 6 of the embodiment of the first aspect for specific implementations of the apparatus, with identical contents being not going to be repeated herein any further.

As shown in FIG. 28, the apparatus 2800 for transmitting uplink data of the embodiment of this disclosure includes:

- a receiving unit 2801 configured to receive a PDCCH transmitted by a network device, the PDCCH indicating the terminal equipment to transmit PUSCH retransmission; wherein CRC to which the PDCCH corresponds is scrambled by a CS-RNTI, and an NDI field of the PDCCH is 1; and
- a transmitting unit 2802 configured to transmit the PUSCH retransmission according to a third power control parameter, the third power control parameter referring to a parameter in UE-specific PUSCH configuration information.

In the embodiment of this disclosure, the third power control parameter includes at least one of the following: P0, Alpha, a pathloss reference signal (PL-RS), and a closed-loop index.

In the embodiment of this disclosure, the third power control parameter is related to at least one of the following factors: a power control indication to which the PDCCH corresponds; an SRS resource indication to which the PDCCH corresponds; and an SRS resource set used for PUSCH transmission and configured for the terminal equipment.

In some embodiments, the third power control parameter being related to a power control indication to which the PDCCH corresponds refers to that a closed-loop index to which the third power control parameter corresponds is identical to a closed-loop index indicated by the PDCCH, and a power control parameter corresponding to the closed-loop index is not configured in configured grant (CG) configuration corresponding to the PUSCH retransmission.

In some embodiments, the third power control parameter being related to an SRS resource indication to which the PDCCH corresponds refers to that the third power control parameter is determined according to the SRS resource indication, the SRS resource indication including a first SRS resource indication and/or a second SRS resource indication.

In some embodiments, the third power control parameter being related to an SRS resource set used for PUSCH transmission and configured for the terminal equipment refers to that the third power control parameter is determined according to the number of SRS resource sets configured on an active BWP to which the PUSCH retransmission transmitted by the terminal equipment corresponds.

In some embodiments, the power control indication to which the PDCCH corresponds refers to an indication of at least one of the following power control parameters by the PDCCH: P0, Alpha, a pathloss reference signal (PL-RS), and a closed-loop index.

In some embodiments, the power control indication to which the PDCCH corresponds refers to that one or two groups of power control parameters are indicated by the PDCCH, wherein each group of power control parameters includes at least one of the following: P0, Alpha, a pathloss reference signal (PL-RS), and a closed-loop index.

In some embodiments, the SRS resource indication to which the PDCCH corresponds refers to indication(s) for the first SRS resource set and/or the second SRS resource set by the PDCCH, wherein the first SRS resource set is used for PUSCH transmission, and the second SRS resource set is used for PUSCH transmission.

In some embodiments, the SRS resource indication to which the PDCCH corresponds refers to a first SRS resource indication and/or a second SRS resource indication.

In some embodiments, the SRS resource set used for PUSCH transmission and configured for the terminal equipment refers to one or two SRS resource sets configured on an active BWP to which the PUSCH retransmission transmitted by the terminal equipment corresponds.

It should be noted that the components or modules related to this disclosure are only described above. However, this disclosure is not limited thereto, and the apparatus 2700/2800 for transmitting uplink data may further include other components or modules, and reference may be made to related techniques for particulars of these components or modules.

Furthermore, for the sake of simplicity, connection relationships between the components or modules or signal profiles thereof are only illustrated in FIGS. 27 and 28. However, it should be understood by those skilled in the art that such related techniques as bus connection, etc., may be adopted. And the above components or modules may be implemented by hardware, such as a processor, a memory, a transmitter, and a receiver, etc., which are not limited in the embodiment of this disclosure.

According to the apparatus of the embodiment of this disclosure, transmission problems of retransmission of uplink transmission with configured grant are solved, and when an uplink transmission with configured grant fails, the network device may indicate the terminal equipment to perform retransmission of uplink transmission with configured grant in a more reliable uplink transmission mode, thereby enhancing robustness.

Embodiment of a Third Aspect

Figure 29:
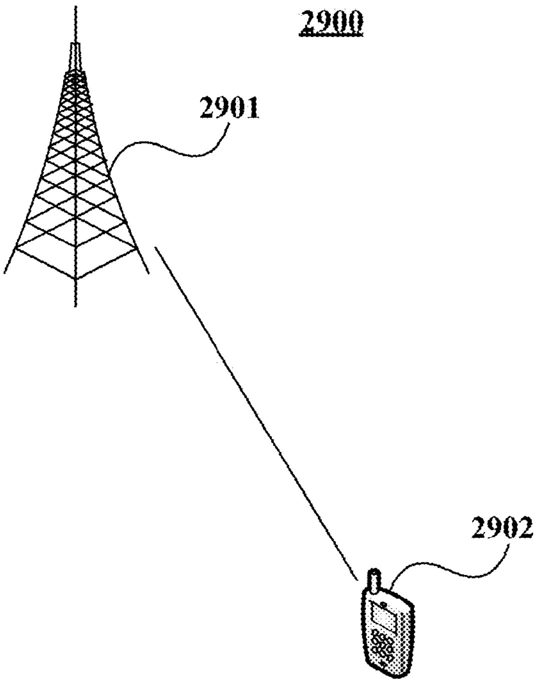
FIG. 29 is a schematic diagram of the communication system of an embodiment of this disclosure.

The embodiment of this disclosure provides a communication system. FIG. 29 is a schematic diagram of the communication system of the embodiment of this disclosure. As shown in FIG. 29, the communication system 2900 includes a network device 2901 and a terminal equipment 2902. For the sake of simplification, description is given in FIG. 29 by taking only one terminal equipment and one network device as examples; however, the embodiment of this disclosure is not limited thereto.

In the embodiment of this disclosure, existing services or services that may be implemented in the future may be performed between the network device 2901 and the terminal equipment 2902. For example, such services may include but not limited to an enhanced mobile broadband (eMBB), massive machine type communication (mMTC), ultra-reliable and low-latency communication (URLLC), and vehicle to everything communication (V2X), etc.

In some embodiments, the network device 2901 generates a PDCCH and transmit the PDCCH to the terminal equipment 2902; the terminal equipment 2902 receives the PDCCH transmitted by the network device 2901, the PDCCH indicating the terminal equipment to transmit PUSCH retransmission; wherein CRC to which the PDCCH corresponds is scrambled by a CS-RNTI, and the NDI field of the PDCCH is 1; and the terminal equipment transmits the PUSCH retransmission according to a first power control parameter in configured grant (CG) configuration to which the PUSCH retransmission corresponds, the first power control parameter including at least one of the following: P0, Alpha, a pathloss reference signal (PL-RS), and a closed-loop index, and the first power control parameter being related to at least one of the following factors: a power control indication to which the PDCCH corresponds; an SRS resource indication to which the PDCCH corresponds; and an SRS resource set used for PUSCH transmission and configured for the terminal equipment. Contents related to the network device 2901 are not limited in this disclosure. Contents related to the terminal equipment 2902 are identical to those in FIG. 5 in the embodiment of the first aspect, which shall not be described herein any further.

In some embodiments, the network device 2901 generates a PDCCH and transmit the PDCCH to the terminal equipment 2902; the terminal equipment 2902 receives the PDCCH transmitted by the network device 2901, the PDCCH indicating the terminal equipment to transmit PUSCH retransmission; wherein CRC to which the PDCCH corresponds is scrambled by a CS-RNTI, and the NDI field of the PDCCH is 1; and the terminal equipment transmits the PUSCH retransmission according to a third power control parameter, the third power control parameter including at least one of the following: P0, Alpha, a pathloss reference signal (PL-RS), and a closed-loop index, and the third power control parameter being related to at least one of the following factors: a power control indication to which the PDCCH corresponds; an SRS resource indication to which the PDCCH corresponds; and an SRS resource set used for PUSCH transmission and configured for the terminal equipment. Contents related to the network device 2901 are not limited in this disclosure. Contents related to the terminal equipment 2902 are identical to those in FIG. 6 in the embodiment of the first aspect, which shall not be described herein any further.

The embodiment of this disclosure further provides a terminal equipment. The terminal equipment may be, for example, a UE; however, this disclosure is not limited thereto, and it may also be another equipment.

Figure 30:
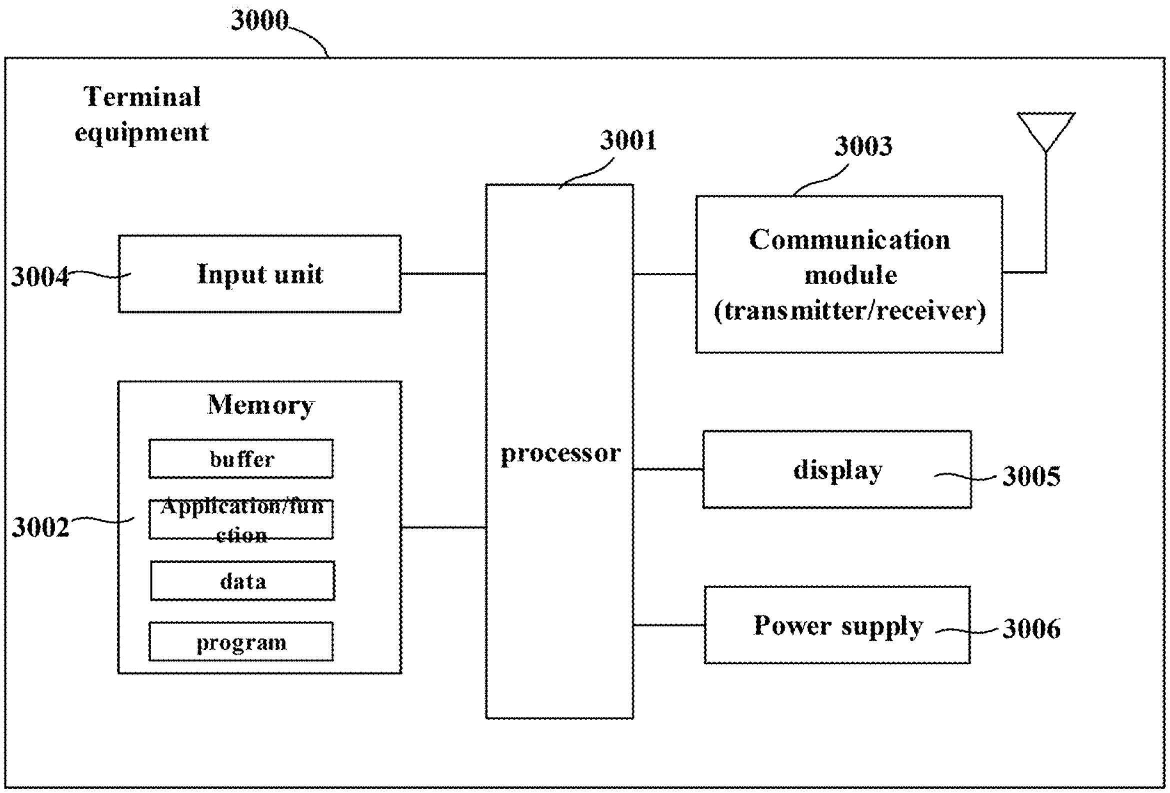
FIG. 30 is a schematic diagram of the terminal equipment of the embodiment of this disclosure.

FIG. 30 is a schematic diagram of the terminal equipment of the embodiment of this disclosure. As shown in FIG. 30, the terminal equipment 3000 may include a processor 3001 and a memory 3002, the memory 3002 storing data and a program and being coupled to the processor 3001. It should be noted that this figure is illustrative only, and other types of structures may also be used, so as to supplement or replace this structure and achieve a telecommunications function or other functions.

For example, the processor 3001 may be configured to execute a program to carry out the method for transmitting uplink data as described in the embodiment of the first aspect.

As shown in FIG. 30, the terminal equipment 3000 may further include a communication module 3003, an input unit 3004, a display 3005, and a power supply 3006; wherein functions of the above components are similar to those in the related art, which shall not be described herein any further. It should be noted that the terminal equipment 3000 does not necessarily include all the parts shown in FIG. 30, and the above components are not necessary. Furthermore, the terminal equipment 3000 may include parts not shown in FIG. 30, and the related art may be referred to.

An embodiment of this disclosure provides a computer readable program, which, when executed in a terminal equipment, will cause a computer to carry out the method for transmitting uplink data as described in the embodiment of the first aspect in the terminal equipment.

An embodiment of this disclosure provides a storage medium storing a computer readable program, which will cause a computer to carry out the method for transmitting uplink data as described in the embodiment of the first aspect in a terminal equipment.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. This disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

As to implementations containing the above embodiments, following supplements are further disclosed.

1. A method for transmitting uplink data, including:

receiving, by a terminal equipment, a PDCCH transmitted by a network device, the PDCCH indicating the terminal equipment to transmit PUSCH retransmission; wherein CRC to which the PDCCH corresponds is scrambled by a CS-RNTI, and an NDI field of the PDCCH is 1; and transmitting the PUSCH retransmission by the terminal equipment according to a first power control parameter in a configured grant (CG) configuration to which the PUSCH retransmission corresponds, the first power control parameter including at least one of the following:

P0,

Alpha, a pathloss reference signal (PL-RS), and a closed-loop index;

and the first power control parameter being related to at least one of the following factors:

a power control indication to which the PDCCH corresponds;

an SRS resource indication to which the PDCCH corresponds; and an SRS resource set used for PUSCH transmission and configured for the terminal equipment.

2. The method according to supplement 1, wherein, the first power control parameter being related to a power control indication to which the PDCCH corresponds refers to that a closed-loop index to which the first power control parameter corresponds is identical to a closed-loop index indicated by the PDCCH.

3. The method according to supplement 1, wherein, the first power control parameter being related to an SRS resource indication to which the PDCCH corresponds refers to that the first power control parameter is determined according to the SRS resource indication, the SRS resource indication including a first SRS resource indication and/or a second SRS resource indication.

4. The method according to supplement 1, wherein, the first power control parameter being related to an SRS resource set used for PUSCH transmission and configured for the terminal equipment refers to that the first power control parameter is determined according to the number of SRS resource sets configured on an active BWP to which the PUSCH retransmission transmitted by the terminal equipment corresponds.

5. The method according to supplement 1, wherein, the power control indication to which the PDCCH corresponds refers to an indication of at least one of the following power control parameters by the PDCCH:

P0,

Alpha, a pathloss reference signal (PL-RS), and a closed-loop index.

6. The method according to supplement 1, wherein, the power control indication to which the PDCCH corresponds refers to that one or two groups of power control parameters are indicated by the PDCCH, wherein each group of power control parameters includes at least one of the following:

P0,

Alpha, a pathloss reference signal (PL-RS), and a closed-loop index.

7. The method according to supplement 1, wherein, the SRS resource indication to which the PDCCH corresponds refers to indication(s) for the first SRS resource set and/or the second SRS resource set by the PDCCH; wherein, the first SRS resource set is used for PUSCH transmission, and the second SRS resource set is used for PUSCH transmission.

8. The method according to supplement 1, wherein, the SRS resource indication to which the PDCCH corresponds refers to a first SRS resource indication and/or a second SRS resource indication.

9. The method according to supplement 1, wherein, the SRS resource set used for PUSCH transmission and configured for the terminal equipment refers to one or two SRS resource sets configured on an active BWP to which the PUSCH retransmission transmitted by the terminal equipment corresponds.

10. The method according to supplement 1, wherein the terminal equipment further transmits the PUSCH retransmission according to a second power control parameter, the second power control parameter referring to a parameter in UE-specific PUSCH configuration information, and including at least one of the following:

P0,

Alpha, a pathloss reference signal (PL-RS), and a closed-loop index;

and the second power control parameter being related to at least one of the following factors:

a power control indication to which the PDCCH corresponds;

an SRS resource indication to which the PDCCH corresponds;

an SRS resource set used for PUSCH transmission and configured for the terminal equipment.

11. A method for transmitting uplink data, including:

receiving, by a terminal equipment, a PDCCH transmitted by a network device, the PDCCH indicating the terminal equipment to transmit PUSCH retransmission; wherein CRC to which the PDCCH corresponds is scrambled by a CS-RNTI, and an NDI field of the PDCCH is 1; and transmitting the PUSCH retransmission by the terminal equipment according to a third power control parameter, the third power control parameter referring to a parameter in UE-specific PUSCH configuration information and including at least one of the following:

P0,

Alpha, a pathloss reference signal (PL-RS), and a closed-loop index;

and the third power control parameter being related to at least one of the following factors:

a power control indication to which the PDCCH corresponds;

an SRS resource indication to which the PDCCH corresponds; and an SRS resource set used for PUSCH transmission and configured for the terminal equipment.

12. The method according to supplement 11, wherein, the third power control parameter being related to a power control indication to which the PDCCH corresponds refers to that a closed-loop index to which the third power control parameter corresponds is identical to a closed-loop index indicated by the PDCCH, and a power control parameter corresponding to the closed-loop index is not configured in configured grant (CG) configuration corresponding to the PUSCH retransmission.

13. The method according to supplement 11, wherein, the third power control parameter being related to an SRS resource indication to which the PDCCH corresponds refers to that the third power control parameter is determined according to the SRS resource indication, the SRS resource indication including a first SRS resource indication and/or a second SRS resource indication.

14. The method according to supplement 11, wherein, the third power control parameter being related to an SRS resource set used for PUSCH transmission and configured for the terminal equipment refers to that the third power control parameter is determined according to the number of SRS resource sets configured on an active BWP to which the PUSCH retransmission transmitted by the terminal equipment corresponds.

15. The method according to supplement 11, wherein, the power control indication to which the PDCCH corresponds refers to an indication of at least one of the following power control parameters by the PDCCH:

P0,

Alpha, a pathloss reference signal (PL-RS), and a closed-loop index.

16. The method according to supplement 11, wherein, the power control indication to which the PDCCH corresponds refers to that one or two groups of power control parameters are indicated by the PDCCH, wherein each group of power control parameters includes at least one of the following:

P0,

Alpha, a pathloss reference signal (PL-RS), and a closed-loop index.

17. The method according to supplement 11, wherein, the SRS resource indication to which the PDCCH corresponds refers to indication(s) for the first SRS resource set and/or the second SRS resource set by the PDCCH; wherein, the first SRS resource set is used for PUSCH transmission, and the second SRS resource set is used for PUSCH transmission.

18. The method according to supplement 11, wherein, the SRS resource indication to which the PDCCH corresponds refers to a first SRS resource indication and/or a second SRS resource indication.

19. The method according to supplement 11, wherein, the SRS resource set used for PUSCH transmission and configured for the terminal equipment refers to one or two SRS resource sets configured on an active BWP to which the PUSCH retransmission transmitted by the terminal equipment corresponds.

20. A terminal equipment, including a memory and a processor, the memory storing a computer program, and the processor being configured to execute the computer program to carry out method as described in any one of supplements 1-19.

21. A communication system, including a terminal equipment and a network device, wherein, the terminal equipment is configured to:

receive a PDCCH transmitted by the network device, the PDCCH indicating the terminal equipment to transmit PUSCH retransmission; wherein CRC to which the PDCCH corresponds is scrambled by a CS-RNTI, and the NDI field of the PDCCH is 1; and transmit the PUSCH retransmission according to a first power control parameter in a configured grant (CG) configuration to which the PUSCH retransmission corresponds, the first power control parameter including at least one of the following:

P0,

Alpha, a pathloss reference signal (PL-RS), and a closed-loop index;

and the first power control parameter being related to at least one of the following factors:

a power control indication to which the PDCCH corresponds;

an SRS resource indication to which the PDCCH corresponds; and an SRS resource set used for PUSCH transmission and configured for the terminal equipment;

and the network device is configured to: transmit the PDCCH to the terminal equipment, and receive the PUSCH retransmission transmitted by the terminal equipment.

22. A communication system, including a terminal equipment and a network device, wherein, the terminal equipment is configured to:

receive a PDCCH transmitted by the network device, the PDCCH indicating the terminal equipment to transmit PUSCH retransmission; wherein CRC to which the PDCCH corresponds is scrambled by a CS-RNTI, and the NDI field of the PDCCH is 1; and transmit the PUSCH retransmission according to a third power control parameter, the third power control parameter referring to a parameter in US-specific PUSCH configuration information and including at least one of the following:

P0,

Alpha, a pathloss reference signal (PL-RS), and a closed-loop index;

and the third power control parameter being related to at least one of the following factors:

a power control indication to which the PDCCH corresponds;

an SRS resource indication to which the PDCCH corresponds; and an SRS resource set used for PUSCH transmission and configured for the terminal equipment;

and the network device is configured to: transmit the PDCCH to the terminal equipment, and receive the PUSCH retransmission transmitted by the terminal equipment.

The invention claimed is:

1. An apparatus for transmitting uplink data, configured in a terminal equipment, the apparatus comprising:

a receiver configured to receive a PDCCH transmitted by a network device, the PDCCH indicating the terminal equipment to transmit PUSCH retransmission; wherein CRC to which the PDCCH corresponds is scrambled by a CS-RNTI, and an NDI field of the PDCCH is 1; and a transmitter configured to transmit the PUSCH retransmission according to a first power control parameter in a configured grant (CG) configuration to which the PUSCH retransmission corresponds, the first power control parameter comprising at least one of the following:

P0,

Alpha, a pathloss reference signal (PL-RS), and a closed-loop index;

and the first power control parameter being related to at least one of the following factors:

a power control indication to which the PDCCH corresponds;

an SRS resource indication to which the PDCCH corresponds; and an SRS resource set used for PUSCH transmission and configured for the terminal equipment, wherein the SRS resource indication to which the PDCCH corresponds refers to indication(s) for the first SRS resource set and/or the second SRS resource set by the PDCCH; wherein, the first SRS resource set is used for PUSCH transmission, and the second SRS resource set is used for PUSCH transmission, and wherein the SRS resource set used for PUSCH transmission and configured for the terminal equipment refers to one or two SRS resource sets configured on an active BWP to which the PUSCH retransmission transmitted by the terminal equipment corresponds.

2. The apparatus according to claim 1, wherein, the first power control parameter being related to a power control indication to which the PDCCH corresponds refers to that a closed-loop index to which the first power control parameter corresponds is identical to a closed-loop index indicated by the PDCCH.

3. The apparatus according to claim 1, wherein, the first power control parameter being related to an SRS resource indication to which the PDCCH corresponds refers to that the first power control parameter is determined according to the SRS resource indication, the SRS resource indication comprising a first SRS resource indication and/or a second SRS resource indication.

4. The apparatus according to claim 1, wherein, the first power control parameter being related to an SRS resource set used for PUSCH transmission and configured for the terminal equipment refers to that the first power control parameter is determined according to the number of SRS resource sets configured on an active BWP to which the PUSCH retransmission transmitted by the terminal equipment corresponds.

5. The apparatus according to claim 1, wherein, the power control indication to which the PDCCH corresponds refers to an indication of at least one of the following power control parameters by the PDCCH:

P0,

Alpha, a pathloss reference signal (PL-RS), and a closed-loop index.

6. The apparatus according to claim 1, wherein, the power control indication to which the PDCCH corresponds refers to that one or two groups of power control parameters are indicated by the PDCCH, wherein each group of power control parameters comprises at least one of the following:

P0,
Alpha,
a pathloss reference signal (PL-RS), and
a closed-loop index.

7. The apparatus according to claim 1, wherein,
the SRS resource indication to which the PDCCH corresponds refers to a first SRS resource indication and/or a second SRS resource indication.

8. The apparatus according to claim 1, wherein the transmitter further transmits the PUSCH retransmission according to a second power control parameter, the second power control parameter referring to a parameter in UE-specific PUSCH configuration information, and comprising at least one of the following:
P0,
Alpha,
a pathloss reference signal (PL-RS), and
a closed-loop index;
and the second power control parameter being related to at least one of the following factors:
a power control indication to which the PDCCH corresponds;
an SRS resource indication to which the PDCCH corresponds;
an SRS resource set used for PUSCH transmission and configured for the terminal equipment.

9. An apparatus for transmitting uplink data, configured in a terminal equipment, the apparatus comprising:
a receiver configured to receive a PDCCH transmitted by a network device, the PDCCH indicating the terminal equipment to transmit PUSCH retransmission; wherein CRC to which the PDCCH corresponds is scrambled by a CS-RNTI, and an NDI field of the PDCCH is 1; and
a transmitter configured to transmit the PUSCH retransmission according to a third power control parameter, the third power control parameter referring to a parameter in UE-specific PUSCH configuration information and comprising at least one of the following:
P0,
Alpha,
a pathloss reference signal (PL-RS), and
a closed-loop index;
and the third power control parameter being related to at least one of the following factors:
a power control indication to which the PDCCH corresponds;
an SRS resource indication to which the PDCCH corresponds; and
an SRS resource set used for PUSCH transmission and configured for the terminal equipment,
wherein the SRS resource indication to which the PDCCH corresponds refers to indication(s) for the first SRS resource set and/or the second SRS resource set by the PDCCH; wherein,
the first SRS resource set is used for PUSCH transmission, and
the second SRS resource set is used for PUSCH transmission, and
wherein the SRS resource set used for PUSCH transmission and configured for the terminal equipment refers to one or two SRS resource sets configured on an active BWP to which the PUSCH retransmission transmitted by the terminal equipment corresponds.

10. The apparatus according to claim 9, wherein,
the third power control parameter being related to a power control indication to which the PDCCH corresponds refers to that a closed-loop index to which the third power control parameter corresponds is identical to a closed-loop index indicated by the PDCCH, and a power control parameter corresponding to the closed-loop index is not configured in configured grant (CG) configuration corresponding to the PUSCH retransmission.

11. The apparatus according to claim 9, wherein,
the third power control parameter being related to an SRS resource indication to which the PDCCH corresponds refers to that the third power control parameter is determined according to the SRS resource indication, the SRS resource indication comprising a first SRS resource indication and/or a second SRS resource indication.

12. The apparatus according to claim 9, wherein,
the third power control parameter being related to an SRS resource set used for PUSCH transmission and configured for the terminal equipment refers to that the third power control parameter is determined according to the number of SRS resource sets configured on an active BWP to which the PUSCH retransmission transmitted by the terminal equipment corresponds.

13. The apparatus according to claim 9, wherein,
the power control indication to which the PDCCH corresponds refers to an indication of at least one of the following power control parameters by the PDCCH:
P0,
Alpha,
a pathloss reference signal (PL-RS), and
a closed-loop index.

14. The apparatus according to claim 9, wherein,
the power control indication to which the PDCCH corresponds refers to that one or two groups of power control parameters are indicated by the PDCCH, wherein each group of power control parameters comprises at least one of the following:
P0,
Alpha,
a pathloss reference signal (PL-RS), and
a closed-loop index.

15. The apparatus according to claim 9, wherein,
the SRS resource indication to which the PDCCH corresponds refers to indication(s) for the first SRS resource set and/or the second SRS resource set by the PDCCH; wherein,
the first SRS resource set is used for PUSCH transmission,
and the second SRS resource set is used for PUSCH transmission.

16. The apparatus according to claim 9, wherein,
the SRS resource indication to which the PDCCH corresponds refers to a first SRS resource indication and/or a second SRS resource indication.

17. The apparatus according to claim 9, wherein,
the SRS resource set used for PUSCH transmission and configured for the terminal equipment refers to one or two SRS resource sets configured on an active BWP to which the PUSCH retransmission transmitted by the terminal equipment corresponds.

18. A terminal equipment, comprising a non-transitory memory and a processor, the non-transitory memory storing one or more executable instructions, and the processor being configured to execute the instructions to carry out at least one of the following:
method 1:
receiving, by the terminal equipment, a PDCCH transmitted by a network device, the PDCCH indicating the terminal equipment to transmit PUSCH retransmission; wherein CRC to which the PDCCH corresponds is scrambled by a CS-RNTI, and the NDI field of the PDCCH is 1; and transmitting the PUSCH retransmission by the terminal equipment according to a first power control parameter in a configured grant (CG) configuration to which the PUSCH retransmission corresponds, the first power control parameter comprising at least one of the following: P0, Alpha, a pathloss reference signal (PL-RS), and a closed-loop index;

and the first power control parameter being related to at least one of the following factors: a power control indication to which the PDCCH corresponds; an SRS resource indication to which the PDCCH corresponds; and an SRS resource set used for PUSCH transmission and configured for the terminal equipment;

method 2:

receiving, by the terminal equipment, a PDCCH transmitted by a network device, the PDCCH indicating the terminal equipment to transmit PUSCH retransmission; wherein CRC to which the PDCCH corresponds is scrambled by a CS-RNTI, and the NDI field of the PDCCH is 1; and transmitting the PUSCH retransmission by the terminal equipment according to a first power control parameter in a configured grant (CG) configuration to which the PUSCH retransmission corresponds and a second control parameter, the first power control parameter comprising at least one of the following: P0, Alpha, a pathloss reference signal (PL-RS), and a closed-loop index;

the first power control parameter being related to at least one of the following factors: a power control indication to which the PDCCH corresponds; an SRS resource indication to which the PDCCH corresponds; and an SRS resource set used for PUSCH transmission and configured for the terminal equipment;

the second power control parameter referring to a parameter in UE-specific PUSCH configuration information and comprising at least one of the following: P0, Alpha, a pathloss reference signal (PL-RS), and a closed-loop index;

the second power control parameter being related to at least one of the following factors: a power control indication to which the PDCCH corresponds; an SRS resource indication to which the PDCCH corresponds; and an SRS resource set used for PUSCH transmission and configured for the terminal equipment;

method 3:

receiving, by the terminal equipment, a PDCCH transmitted by a network device, the PDCCH indicating the terminal equipment to transmit PUSCH retransmission; wherein CRC to which the PDCCH corresponds is scrambled by a CS-RNTI, and the NDI field of the PDCCH is 1; and transmitting the PUSCH retransmission by the terminal equipment according to a third power control parameter, the third power control parameter referring to a parameter in UE-specific PUSCH configuration information and comprising at least one of the following: P0, Alpha, a pathloss reference signal (PL-RS), and a closed-loop index;

and the third power control parameter being related to at least one of the following factors: a power control indication to which the PDCCH corresponds; an SRS resource indication to which the PDCCH corresponds; and an SRS resource set used for PUSCH transmission and configured for the terminal equipment, wherein the SRS resource indication to which the PDCCH corresponds refers to indication(s) for the first SRS resource set and/or the second SRS resource set by the PDCCH; wherein, the first SRS resource set is used for PUSCH transmission, and the second SRS resource set is used for PUSCH transmission, and wherein the SRS resource set used for PUSCH transmission and configured for the terminal equipment refers to one or two SRS resource sets configured on an active BWP to which the PUSCH retransmission transmitted by the terminal equipment corresponds.

* * * * *